United States Patent
Suzuki et al.

(10) Patent No.: US 11,392,475 B2
(45) Date of Patent: Jul. 19, 2022

(54) JOB POWER PREDICTING METHOD AND INFORMATION PROCESSING APPARATUS

(71) Applicant: FUJITSU LIMITED, Kawasaki (JP)

(72) Inventors: Shigeto Suzuki, Kawasaki (JP); Michiko Shiraga, Kawasaki (JP); Koichi Shirahata, Yokohama (JP); Hiroshi Endo, Atsugi (JP); Hiroyuki Fukuda, Yokohama (JP); Takuji Yamamoto, Hachiouji (JP)

(73) Assignee: FUJITSU LIMITED, Kawasaki (JP)

( * ) Notice: Subject to any disclaimer, the term of this patent is extended or adjusted under 35 U.S.C. 154(b) by 182 days.

(21) Appl. No.: 16/752,086

(22) Filed: Jan. 24, 2020

(65) Prior Publication Data
US 2020/0257605 A1     Aug. 13, 2020

(30) Foreign Application Priority Data
Feb. 12, 2019   (JP) .............................. JP2019-022253

(51) Int. Cl.
*G06F 11/30*     (2006.01)
*G06F 11/34*     (2006.01)

(52) U.S. Cl.
CPC ...... *G06F 11/3062* (2013.01); *G06F 11/3419* (2013.01)

(58) Field of Classification Search
CPC ............. G06F 11/3062; G06F 11/3419; G06F 11/30; G06F 611/3089; G06F 11/3452; G06F 11/3409; Y02D 10/00
USPC ................................ 713/300, 320, 330, 340
See application file for complete search history.

(56) References Cited

U.S. PATENT DOCUMENTS

| | | | |
|---|---|---|---|
| 2016/0004620 A1 | 1/2016 | Ohike | |
| 2018/0144272 A1* | 5/2018 | Moroo | G06F 9/505 |
| 2019/0235791 A1* | 8/2019 | Chun | G06F 9/4893 |

FOREIGN PATENT DOCUMENTS

| | | |
|---|---|---|
| JP | 09-146915 | 6/1997 |
| WO | WO 2014/184928 | 11/2014 |

* cited by examiner

*Primary Examiner* — Michael J Brown
(74) *Attorney, Agent, or Firm* — Staas & Halsey LLP

(57) ABSTRACT

A non-transitory computer-readable recording medium has stored therein a program that causes a computer to execute a process including: dividing a time from a start to an end of execution of a first job into a plurality of time periods, the time being represented in first power consumption information; calculating a cycle of a time-series variation of power consumption within each time period; generating, for each of the plurality of time periods, a prediction model for predicting power consumption of a predetermined future time; acquiring second power consumption information that is an actual measurement value of power consumption according to an elapsed time from a start of execution of a second job that is being executed; and predicting future power consumption of the second job, using the prediction model generated for a time period including the elapsed time from the start of execution of the second job to a present.

9 Claims, 33 Drawing Sheets

FIG. 8

112  JOB POWER CONSUMPTION INFORMATION

| TIME ELAPSED \ JOB NAME | JOB1 | JOB2 | JOB3 |
|---|---|---|---|
| 5 | 20W | 10W | 40W |
| 10 | 30W | 12W | 20W |
| 15 | 20W | 11W | 30W |
| ⋮ | ⋮ | ⋮ | ⋮ |

FIG. 23

61a PREDICTION MODEL SELECTION TABLE (FIRST FUTURE POINT)

| TIMING | PREDICTION MODEL #1 ACTUAL MEASUREMENT RMSE | PREDICTION MODEL #2 ACTUAL MEASUREMENT RMSE | PREDICTION MODEL #3 ACTUAL MEASUREMENT RMSE | PREDICTION MODEL #4 ACTUAL MEASUREMENT RMSE | PREDICTION MODEL #5 ACTUAL MEASUREMENT RMSE | PREDICTION MODEL #6 ACTUAL MEASUREMENT RMSE |
|---|---|---|---|---|---|---|
| t1 | 0.1 | 0.1 | 0.1 | 0.3 | 0.2 | 0.4 |
| t2 | 0.2 | 0.2 | 0.1 | 0.1 | 0.4 | 0.2 |
| t3 | 0.1 | 0.5 | 0.1 | 0.4 | 0.2 | 0.3 |
| t4 | 0.2 | 0.6 | 0.2 | 0.3 | 0.4 | 0.2 |
| t5 | 0.3 | 0.2 | 0.1 | 0.5 | 0.2 | 0.5 |
| SUM | 0.9 | 1.6 | 0.6 ← SMALLEST | 1.6 | 1.4 | 1.6 |

JOB POWER PREDICTING METHOD AND INFORMATION PROCESSING APPARATUS

CROSS-REFERENCE TO RELATED APPLICATION

This application is based upon and claims the benefit of priority of the prior Japanese Patent Application No. 2019-022253, filed on Feb. 12, 2019, the entire contents of which are incorporated herein by reference.

FIELD

The embodiments discussed herein are related to a job power predicting method and an information processing apparatus.

BACKGROUND

A large-scale computer system (hereinafter, simply also referred to as a system) such as an HPC (high performance computing) system consumes a large amount of power. Thus, in order to stably operate the system, it becomes important to appropriately manage the power consumption of the system. For example, the load of the power feeding facility is reduced as long as the power consumption of the system may be kept constant.

In order to manage the power consumption of the system, the power demand by the system may be predicted in advance. As for the method of predicting the entire power of the system, a method may be conceived which specifies a similar job from past job input information including a job name, etc., and uses the power consumption of the specified job as a predicted value, to predict the power consumption of a newly input job.

After an execution of a job is started, future power consumption of the job that is being executed may be predicted by a recurrent method, based on a past/current time-series variation of power consumption of the job (power waveform). By adding up a prediction result of power consumption of each job that is being executed, the total power consumption of all jobs that are being executed may be obtained.

As a technique usable for predicting power consumption, for example, there has been proposed a detection device which detects a correlation from various data generated from an IT (information technology) system. Further, there has been proposed a chaos time-series short-term prediction device which is characterized in a method of treating time-series data to be predicted to improve a prediction accuracy.

Related technologies are disclosed in, for example, International Publication Pamphlet No. WO 2014/184928 and Japanese Laid-open Patent Publication No. 09-146915.

SUMMARY

According to an aspect of the embodiment, a non-transitory computer-readable recording medium has stored therein a program that causes a computer to execute a process, the process including: dividing a time from a start to an end of execution of a first job into a plurality of time periods, the time being represented in first power consumption information that includes an actual measurement value of power consumption according to an elapsed time from the start of execution of the first job, the first job being among a plurality of first jobs; calculating, for each of the plurality of time periods, a cycle of a time-series variation of power consumption within the time period, based on the first power consumption information; generating, for each of the plurality of time periods, a prediction model for predicting power consumption of a predetermined future time using an actual measurement value of power consumption for a time corresponding to the calculated cycle, based on the first power consumption information; acquiring second power consumption information that is an actual measurement value of power consumption according to an elapsed time from a start of execution of a second job that is being executed; and predicting future power consumption of the second job, using the prediction model generated for a time period including the elapsed time from the start of execution of the second job to a present, among the plurality of time periods, based on the second power consumption information.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 8 is a view illustrating an example of job power consumption information;

FIG. 23 is a view illustrating an example of a prediction model selection table;

DESCRIPTION OF EMBODIMENTS

A time-series variation of power consumption of a job may have a periodicity. In this case, a computer for predicting power consumption of a job may appropriately capture a cycle of a time-series variation of power consumption of a job that is being executed, calculate a power waveform in each cycle, and predict the power consumption in consideration of the periodicity, so as to improve the prediction accuracy. However, the cycle of the time-series variation of the power consumption may differ for each time period, and when the cycle of the time-series variation of the power consumption differs for each time period, the related art is unable to appropriately determine the cycle for each time period. As a result, it becomes difficult to improve the prediction accuracy.

Hereinafter, embodiments of the present disclosure will be described with reference to the accompanying drawings. In addition, the embodiments may be implemented in a combined form within a scope that causes no inconsistency.

First Embodiment

Figure 1:
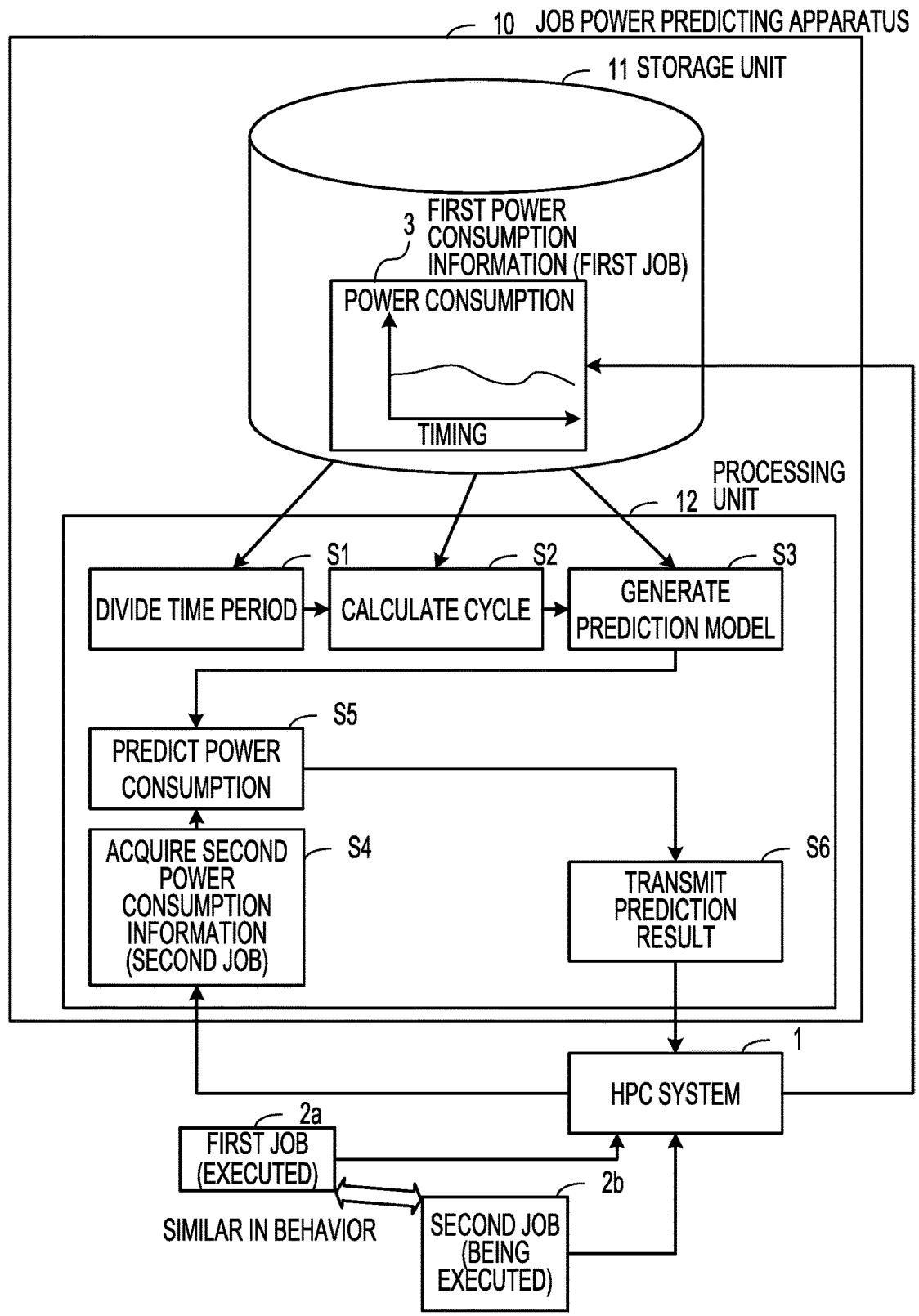
FIG. 1 is a diagram illustrating an example of a job power predicting method according to a first embodiment.

FIG. 1 is a diagram illustrating an example of a job power predicting method according to a first embodiment. FIG. 1 represents an example where a job power predicting method is performed using a job power predicting apparatus 10. The job power predicting apparatus 10 is, for example, an information processing apparatus capable of performing the job power predicting method by executing a job power prediction program that describes a process procedure of the job power predicting method.

The job power predicting apparatus 10 predicts the power consumption of a job to be executed by an HPC system 1. The job power predicting apparatus 10 includes a storage unit 11 and a processing unit 12 in order to implement the job power predicting method. The storage unit 11 is, for example, a memory or a storage device included in the job power predicting apparatus 10. The processing unit 12 is, for example, a processor or an arithmetic operation circuit included in the job power predicting apparatus 10.

The storage unit 11 stores first power consumption information 3 that indicates actual measurement values of power consumption of a first job 2a according to an elapsed time from the start of execution of the first job 2a. In addition, the first job 2a is, for example, a job similar to a second job 2b which is a target for the prediction of power consumption, in behavior of a time-series variation of power consumption. For example, when the first job 2a and the second job 2b use the same application program, the jobs may be considered similar to each other in behavior of a time-series variation of power consumption. In addition, when the same user requests the execution of the first job 2a and the second job 2b, the second job 2b is estimated to be executed for the same process such as arithmetic operation/analysis, etc., as the first job 2a, and the jobs may be considered similar to each other in behavior of a time-series variation of power consumption. Further, when the first job 2a and the second job 2b refer to the same library, the jobs may be estimated to be also similar to each other in processes to be executed, and thus, may be considered similar to each other in behavior of a time-series variation of power consumption.

The processing unit 12 divides the time from the start to the end of execution of the first job 2a, which is indicated in the first power consumption information 3 indicating actual measurement values of power consumption of the first job 2a according to the elapsed time from the start of execution of the first job 2a, into a plurality of time periods (step S1). Then, for each of the plurality of time periods, the processing unit 12 calculates a cycle of a time-series variation of power consumption within the corresponding time period, based on the first power consumption information 3 (step S2). Further, for each of the plurality of time periods, the processing unit 12 generates a prediction model for predicting power consumption of a predetermined future time, using actual measurement values of power consumption corresponding to the time of the calculated cycle (e.g., one cycle), based on the first power consumption information 3 (step S3). Then, when the execution of the second job 2b is started in the HPC system 1, the processing unit 12 acquires second power consumption information that indicates past/current actual measurement values of power consumption of the second job 2b according to an elapsed time from the start of execution of the second job 2b (step S4). Then, based on the second power consumption information, the processing unit 12 predicts future power consumption of the second job 2b, using a prediction model generated for a time period including the elapsed time from the start of execution of the second job 2b to the present, among the plurality of time periods (step S5). The processing unit 12 transmits the predicted power consumption to, for example, the HPC system 1 (step S6).

In this way, the cycle of the time-series variation of the power consumption of the first job 2a executed in the past is determined for each time period, and future power consumption of the second job 2b is predicted using the actual measurement values of the time period corresponding to the cycle, so that an accurate prediction may be implemented based on the actual measurement values of the appropriate time period. That is, power consumption is predicted using an appropriate prediction model in consideration of the periodicity in each time period of the time-series variation of the power consumption of the second job 2b, so that even when the cycle of the time-series variation of the power consumption of the second job 2b changes during the execution of the second job 2b, the power consumption may be predicted with a relatively high accuracy.

Figure 2:
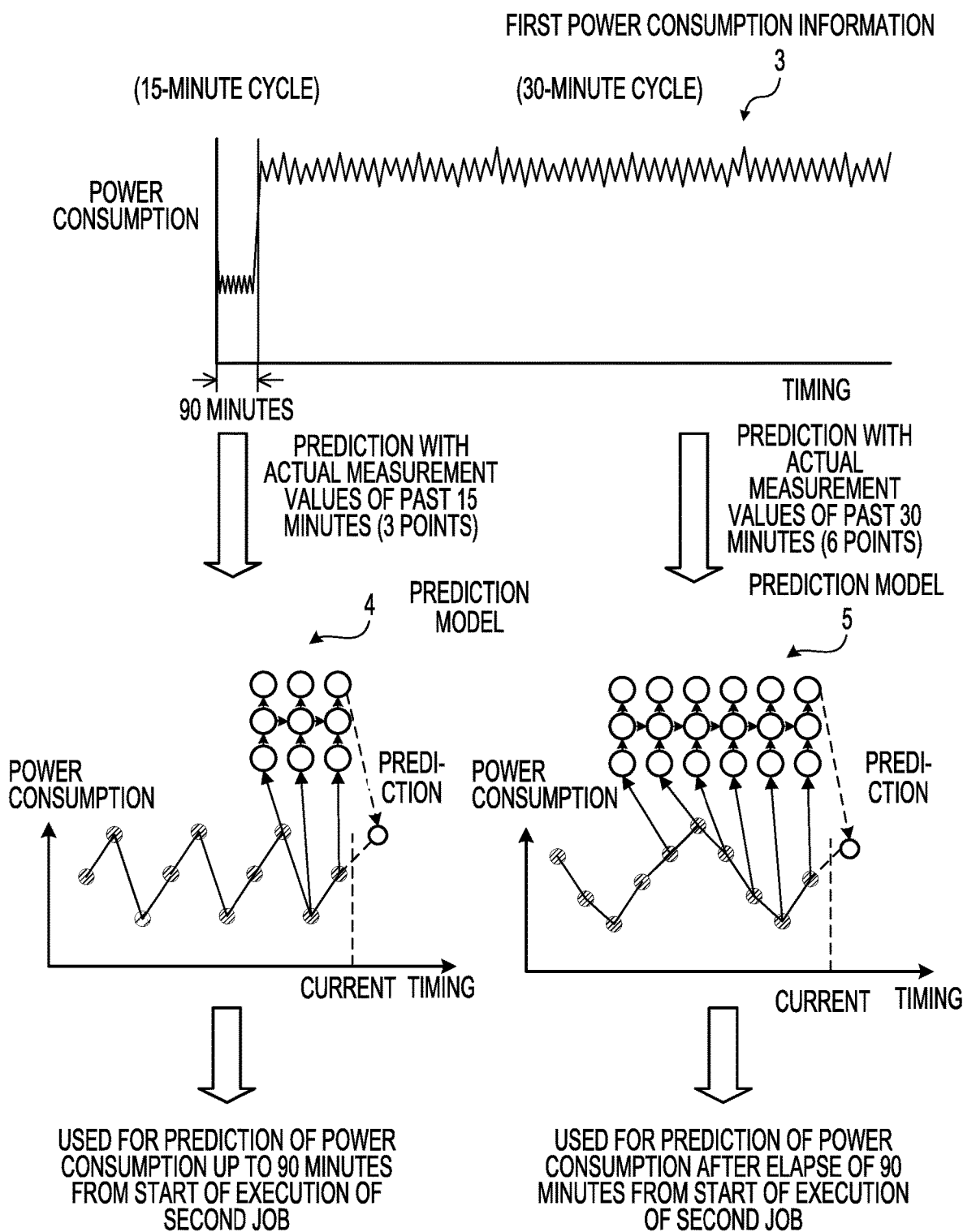
FIG. 2 is a view illustrating an example of generation of a prediction model according to a cycle.

FIG. 2 is a view illustrating an example of the generation of a prediction model according to a cycle. For example, it is assumed that the first power consumption information 3 indicates that the power consumption varies with time in a 15-minute cycle for 90 minutes from the start of execution of the first job 2a, and varies with time in a 30-minute cycle thereafter. Further, it is assumed that the interval for measuring the power consumption of the job is 5 minutes.

In this case, the processing unit 12 generates a prediction model 4 for predicting future power by using actual measurement values (3 points) of the past 15 minutes, according to the first 90-minute time period. Further, the processing unit 12 generates a prediction model 5 for predicting future power by using actual measurement values (6 points) of the past 30 minutes, according to the time period after the elapse of 90 minutes. For example, the processing unit 12 may use learning results obtained using a RNN (recurrent neural network) as the prediction models 4 and 5.

For the time period up to 90 minutes from the start of execution of the second job 2b, the processing unit 12 inputs the actual measurement values of the power consumption of the second job 2b to the prediction model 4, so as to predict future power consumption. Further, for the time period after the elapse of 90 minutes from the start of execution of the second job 2b, the processing unit 12 inputs the actual measurement values of the power consumption of the second job 2b to the prediction model 5, so as to predict future power consumption. In this way, an appropriate prediction model for each time period is used, so that the prediction accuracy of power consumption is improved.

Further, since a time period of execution of a job is divided into multiple time periods, and a cycle is calculated for each time period, the prediction may be implemented with a relatively high accuracy based on an appropriate cycle for each time period, even when the cycle of the time-series variation of power consumption changes during the execution of the job.

Further, a job similar to the second job 2b in behavior may be determined based on, for example, status information. The status information is information including, for example, a job name, a name of a user who requests an execution of a job, a name of an application program used for executing a job, a name of a library referred to when a job is executed, etc.

For example, the processing unit 12 classifies the plurality of first and second jobs 2a and 2b into one or more groups based on the similarity in status information of a job. Then, the processing unit 12 collects jobs which are similar to each other in one or more items among a user name, an application program name, and a library name, in the same group. Further, the processing unit 12 performs the calculation of a cycle and the generation of a prediction model, for each group. Then, the processing unit 12 predicts the power consumption of the second job 2b by using a prediction model generated for the group to which the second job 2b belongs (own group). As a result, the first job 2a similar to the second job 2b in behavior may be correctly detected, and the power consumption of the second job 2b may be calculated with a relatively high accuracy based on the information on the power consumption of the first job 2a.

In addition, the processing unit 12 may generate a plurality of prediction models for different times up to a future prediction timing. For example, the processing unit 12 may generate prediction models for predicting power consumptions of future 5 minutes, future 10 minutes, future 15 minutes, . . . , respectively. When a plurality of prediction models is generated for different times up to a future prediction timing, the processing unit 12 employs a prediction result of a prediction model determined according to a prediction accuracy calculated by a past prediction performance, among prediction results of the plurality of prediction models capable of predicting power consumption at a prediction target timing. For example, among the plurality of prediction models, a prediction result of a prediction model with the highest accuracy is employed. In this way, the prediction is performed using a prediction model determined according to the prediction accuracy among the plurality of prediction models, the prediction accuracy may be further improved.

In addition, the frequency at which a cycle of a time-series variation of power consumption changes may not be grasped before the first power consumption information 3 is analyzed. Further, the length of an obtained cycle may not also be grasped before the first power consumption information 3 is analyzed. When the time period of the execution of the first job 2a indicated in the first power consumption information 3 is divided into excessively short time periods at the beginning, the length of each time period becomes shorter than one cycle of a time-series variation of power consumption in the corresponding time period, and thus, a cycle may not be obtained. Thus, the processing unit 12 divides the time period in a coarse unit (e.g., two division units) at the beginning, and gradually increases the number of division units while detecting the periodicity.

For example, the processing unit 12 sets the time from the start to the end of the execution of the first job 2a as an initial value of a cycle-unestablished time period of which cycle is not established. Next, each time a cycle-unestablished time period is set, the processing unit 12 repeatedly divides the cycle-unestablished time period while increasing the number of division units from the initial value. Further, each time the cycle-unestablished time period is divided, the processing unit 12 calculates a predicted cycle of a time-series variation of power consumption for each divided time period. Then, when there exists a plurality of time periods with the same calculated predicted cycles, the processing unit 12 establishes the calculated predicted cycles as cycles of the corresponding time periods, sets the corresponding time periods as cycle-established time periods, and sets the time period other than the cycle-established time periods as a new cycle-unestablished time period.

In this way, the division is performed with a small number of division units at the beginning, and the number of division units is gradually increased, so that a cycle of each time period may be reliably calculated. Further, since unnecessary divisions in an excessively fine unit are not performed, an increase of a process amount due to an excessive number of division units may be suppressed.

Second Embodiment

Next, a second embodiment will be described. In the second embodiment, power consumption of a job is predicted by using a learning model learned using a neural network.

Figure 3:
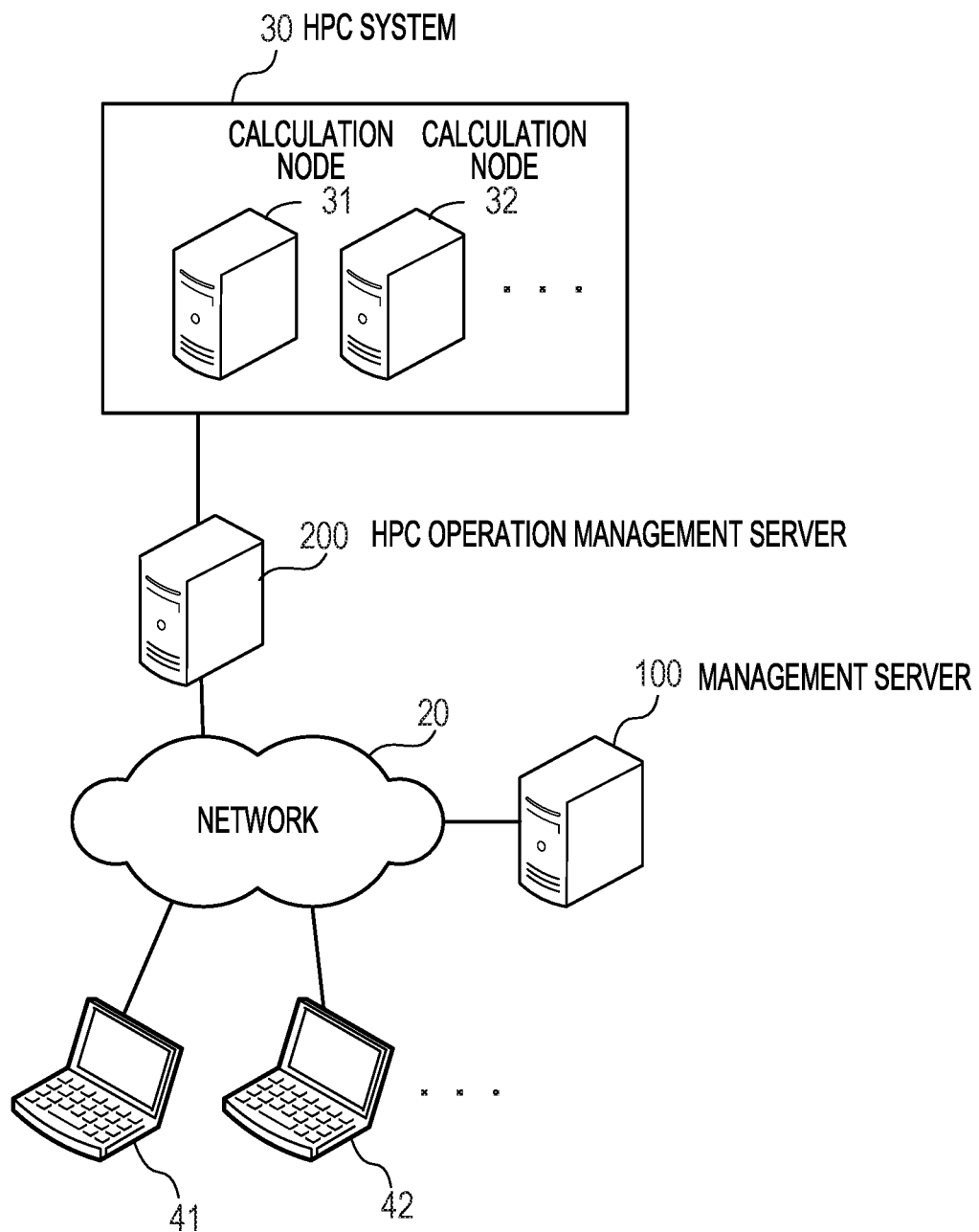
FIG. 3 is a view illustrating an example of a system configuration of a second embodiment.

FIG. 3 is a view illustrating an example of a system configuration according to the second embodiment. The HPC system 30 includes multiple calculation nodes 31, 32, . . . . The calculation nodes 31, 32, . . . are computers that execute input jobs.

The computing nodes 31, 32, . . . in the HPC system 30 are connected to an HPC operation management server 200. The HPC operation management server 200 is a computer that manages the operation of the HPC system 30. For example, the HPC operation management server 200 monitors time-series variations of power consumptions of the calculation nodes 31, 32, . . . when jobs are performed. Further, for an execution waiting job, the HPC operation management server 200 receives a prediction result of a power consumption pattern of the job from a management server 100, and performs a job scheduling to, for example, unify the power consumption of the system. Then, the HPC operation management server 200 instructs the computation nodes 31, 32, . . . to execute jobs according to a generated job execution schedule.

The HPC operation management server 200 is connected to terminal devices 41, 42, . . . and the management server 100 via a network 20. The terminal devices 41, 42, . . . are computers used by users who desire to execute jobs by the HPC system 30. Each of the terminal devices 41, 42, . . . generates job information indicating contents of a job to be executed by the HPC system 30 based on input by a user, and transmits a job input request including the generated job information to the HPC operation management server 200. The job information includes status information such as an application program name used for a job.

The management server 100 is a computer (information processing apparatus) that supports the management of the power consumption of the HPC system 30 by the HPC operation management server 200. The management server 100 acquires job information of a job to be executed and power information indicating a power consumption pattern of an executed job, from the HPC operation management server 200. The management server 100 predicts a power consumption pattern of an execution waiting job, based on the information acquired from the HPC operation management server 200. Then, the management server 100 transmits the prediction result of the power consumption pattern of the job to the HPC operation management server 200.

Figure 4:
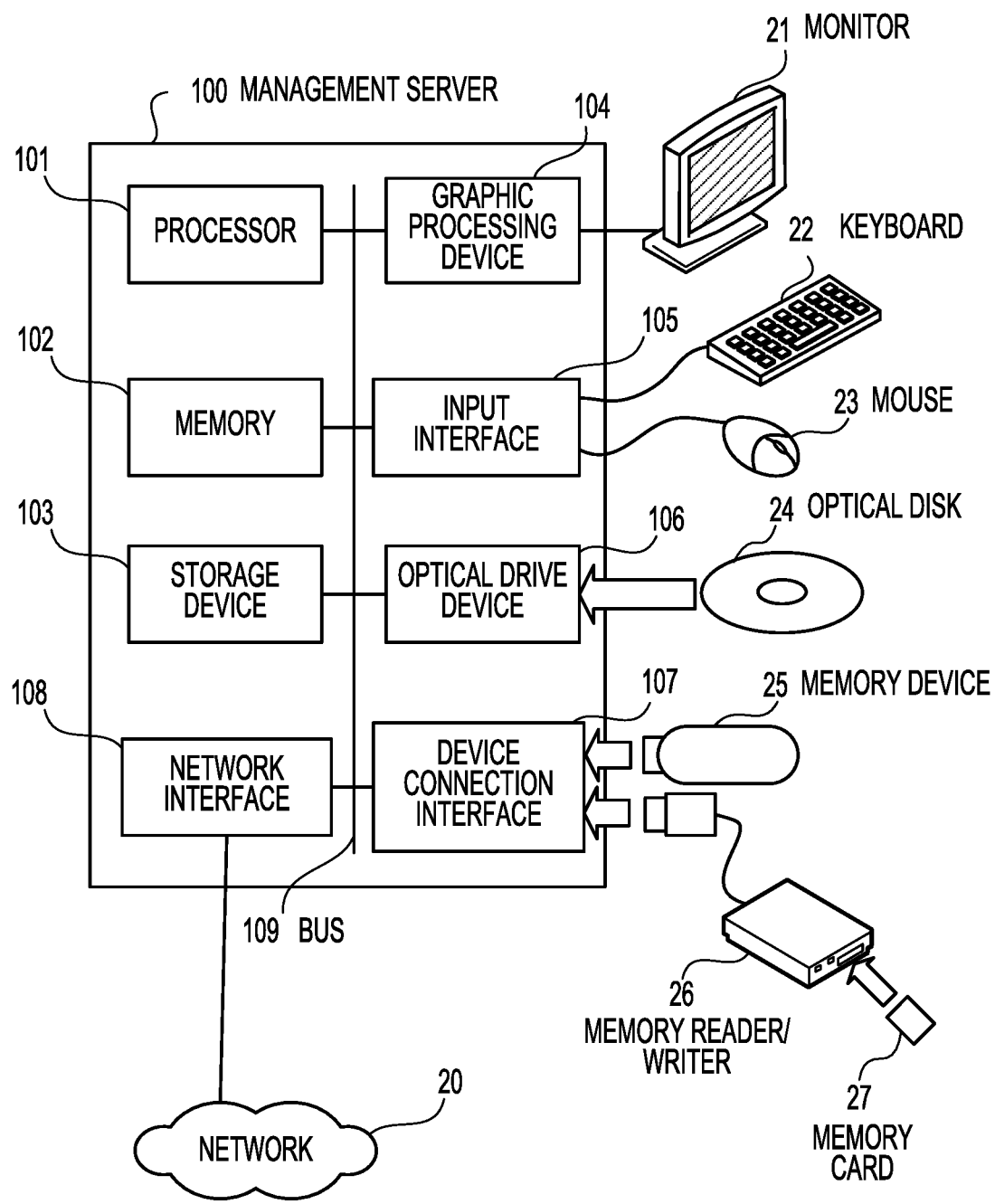
FIG. 4 is a view illustrating an example of a hardware configuration of a management server.

FIG. 4 is a view illustrating an example of a hardware configuration of the management server. The management server 100 is entirely controlled by a processor 101. A memory 102 and a plurality of peripheral devices are connected to the processor 101 via a bus 109. The processor 101 may be a multi-processor. The processor 101 is, for example, a CPU (central processing unit), an MPU (micro processing unit), or a DSP (digital signal processor). At least a portion of the functions implemented in the manner that the processor 101 executes programs may be implemented by an electronic circuit such as an ASIC (application specific integrated circuit) or a PLD (programmable logic device).

The memory 102 is used as a main storage device of the management server 100. The memory 102 temporarily stores an OS (operating system) program or at least a portion of application programs to be executed by the processor 101. Further, the memory 102 stores various data to be used for processes performed by the processor 101. As for the memory 102, for example, a volatile semiconductor storage device such as a RAM (random access memory) is used.

The peripheral devices connected to the bus 109 are a storage device 103, a graphic processing device 104, an input interface 105, an optical drive device 106, a device connection interface 107, and a network interface 108.

The storage device 103 electrically or magnetically performs data write and data read with respect to a recording medium equipped therein. The storage device 103 is used as an auxiliary storage device of a computer. The storage device 103 stores an OS program, application programs, and various data. In addition, as the storage device 103, for example, an HDD (hard disk drive) or an SSD (solid state drive) may be used.

A monitor 21 is connected to the graphic processing device 104. The graphic processing device 104 causes an image to be displayed on a screen of the monitor 21 according to an instruction from the processor 101. The monitor 21 is a display device using organic EL (electro luminescence), a liquid crystal display device or the like.

A keyboard 22 and a mouse 23 are connected to the input interface 105. The input interface 105 transmits a signal sent from the keyboard 22 or the mouse 23, to the processor 101. In addition, the mouse 23 is an example of a pointing device, and another pointing device may be used. Another pointing device is a touch panel, a tablet, a touch pad, a trackball or the like.

The optical drive device 106 performs read of data recorded on an optical disk 24 using laser light or the like. The optical disk 24 is a portable recording medium on which data readable by light reflection is recorded. The optical disk 24 is a DVD (digital versatile disk), a DVD-RAM, a CD-ROM (compact disk read only memory), a CD-R (recordable)/RW (rewritable) or the like.

The device connection interface 107 is a communication interface for connecting the peripheral devices to the management server 100. For example, a memory device 25 or a memory reader/writer 26 may be connected to the device connection interface 107. The memory device 25 is a recording medium having a function to communicate with the device connection interface 107. The memory reader/writer 26 is a device that writes data to the memory card 27 or reads data from the memory card 27. The memory card 27 is a card type recording medium.

The network interface 108 is connected to the network 20. The network interface 108 transmits/receives data to/from other computers or communication devices via the network 20.

The management server 100 is able to implement the process functions of the second embodiment with the hardware configuration described above. In addition, the HPC operation management server 200 and the calculation nodes 31, 32, . . . may also be implemented by the same hardware as that of the management server 100 illustrated in FIG. 4. Further, the job power prediction apparatus 10 described in the first embodiment may also be implemented by the same hardware as that of the management server 100 illustrated in FIG. 4.

The management server 100 implements the process functions of the second embodiment by executing programs recorded on, for example, a computer-readable recording medium. The programs that describe the process contents to be executed by the management server 100 may be recorded on various recording media. For example, the programs to be executed by the management server 100 may be stored in the storage device 103. The processor 101 loads at least a portion of the programs from the storage device 103 into the memory 102, and executes the programs. In addition, the programs to be executed by the management server 100 may be stored in a portable recording medium such as the optical disk 24, the memory device 25, the memory card 27 or the like. The programs stored in the portable recording medium become executable after being installed in the storage device 103 under, for example, the control from the processor 10. In addition, the processor 101 may read and execute the programs directly from the portable recording medium.

In the system illustrated in FIG. 3, the HPC operation management server 200 and the management server 100 operate in cooperation with each other, such that the power management is appropriately implemented based on a prediction result of a power consumption pattern in a job unit. For example, the management server 100 predicts a time-series variation of power consumption when a newly input job to be newly executed is executed. The time-series variation of power consumption is represented by, for example, a power waveform. Based on the power waveform of the newly input job, the HPC operation management server 200 performs a job scheduling to, for example, control the maximum power consumption of the HPC system 30 to be low.

The management server 100 further verifies the accuracy of prediction of power consumption, based on past/current actual measurement values of power consumption in a job that is being executed. When an error between a prediction result and an actual measurement value is equal to or more than a predetermined value, the management server 100 predicts a time-series variation of future power consumption, based on the past/current actual measurement values of the power consumption of the corresponding job.

For example, the management server 100 may obtain cycles that appear in a power waveform of a certain job by an autocorrelation of the power waveform. The management server 100 predicts future power consumption of the job, by using actual measurement values of power consumption information for a time period of one of the obtained cycles.

In addition, a variation cycle of power consumption may differ for each time period, depending on power consumption information to be predicted. Thus, the management server 100 determines cycles of a time-series variation of power consumption according to time periods from the start of execution of a job, based on power consumption information of a job similar to the prediction target job in time-series variation of power consumption. Then, the management server 100 predicts future power consumption, based on past actual measurement values of power corresponding to one of the cycles of the time-series variation of power consumption according to the time periods from the start of execution of the prediction target job. As a result, the prediction accuracy may be improved.

Figure 5:
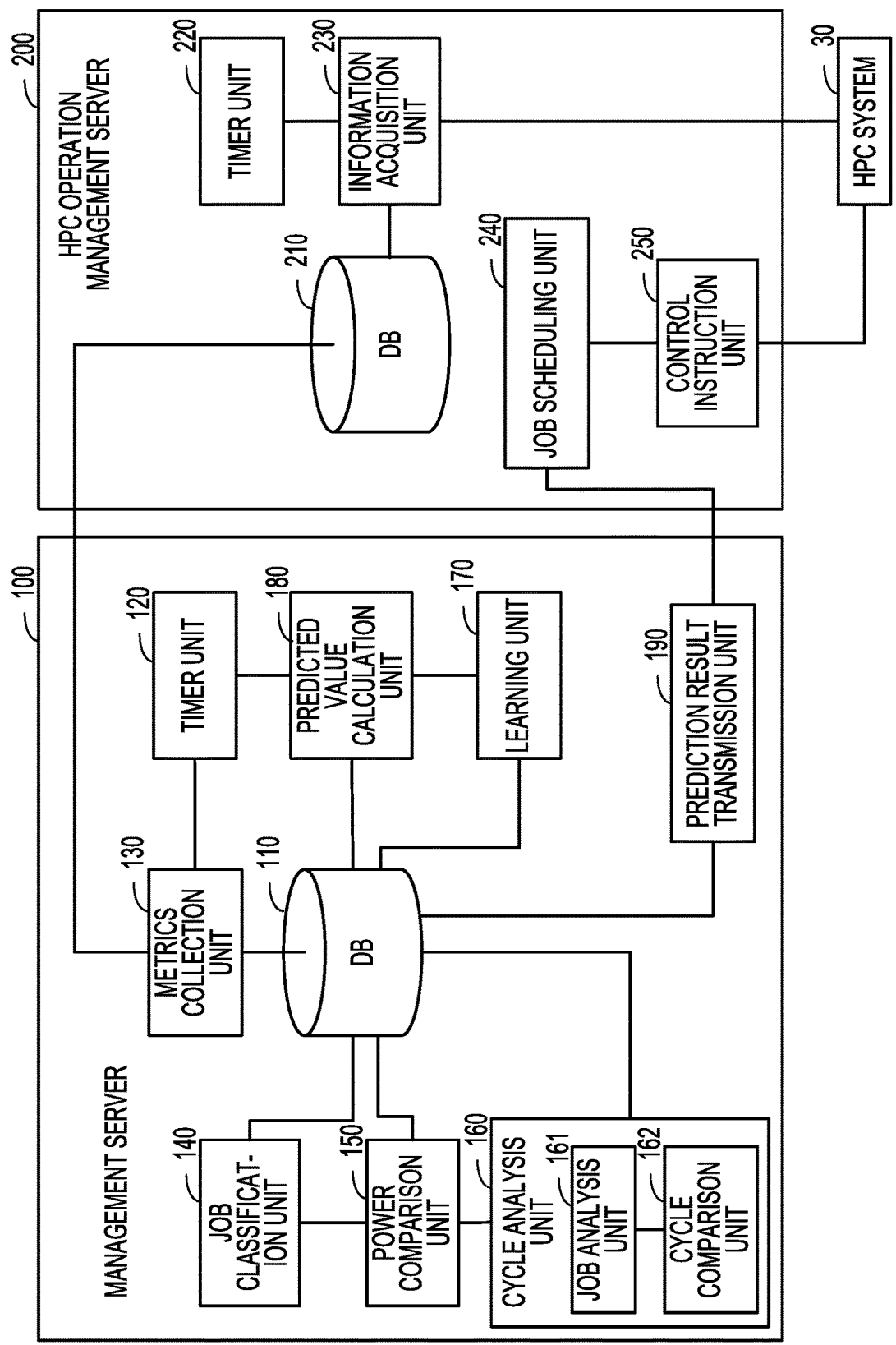
FIG. 5 is a block diagram illustrating a function of each device for a power management.

FIG. 5 is a block diagram illustrating functions of each apparatus for managing power. The HPC operation management server 200 includes a DB 210, a timer unit 220, an information acquisition unit 230, a job scheduling unit 240, and a control instruction unit 250.

The DB 210 stores job status information indicating a status of a job to be executed or job power consumption information indicating a time-series variation of power consumption of an executed job.

The timer unit 220 manages a timing for collecting power consumption information for each job from the HPC system 30. For example, the timer unit 220 instructs the information acquisition unit 230 to collect job power consumption information at a regular time interval.

According to the instruction from the timer unit 220, the information acquisition unit 230 acquires time-series power data of a job that was executed in the HPC system 30, from the HPC system 30. The information acquisition unit 230 stores the acquired power consumption information in the DB 210.

In addition, the HPC system 30 has a function to measure power for each job. For example, each of the computation nodes 31, 32, . . . in the HPC system 30 is provided with a device for measuring power consumption, and is able to calculate a difference between power consumption in a state where no job is being executed and power consumption during an execution of a job, as power consumption of the corresponding job. In addition, the calculation nodes 31, 32, . . . may predict power consumption of a job based on information of a temperature sensor or the like. For example, the calculation nodes 31, 32, . . . collect a CPU temperature and an exhaust temperature of a system board (SB) by a temperature sensor. The calculation nodes 31, 32, . . . first calculate a CPU temperature variation ($T_{cpu}$) and a SB exhaust temperature variation ($T_{air}$), based on the collected temperature data.

The CPU temperature variation ($T_{cpu}$) may be calculated by the following equation:

$$\text{CPU temperature variation } (T_{cpu}) = \text{CPU temperature} - \text{water cooling input temperature} \quad (1)$$

Further, the exhaust temperature variation ($T_{air}$) of the system board may be calculated by the following equation:

$$\text{SB exhaust temperature variation } (T_{air}) = \text{SB exhaust temperature} - \text{rack air suction temperature} \quad (2)$$

The computation nodes 31, 32, . . . calculate the power consumption of the CPU from the CPU temperature variation (e.g., power consumption of CPU=$1.02 \cdot T_{cpu}$). Further, the calculation nodes 31, 32, . . . calculate the power consumption of the memory from the SB exhaust temperature (e.g., power consumption of memory=$0.254 \cdot T_{air}$). Furthermore, the calculation nodes 31, 32, . . . assume that power consumption of an interconnect controller (ICC) is a constant value (e.g., power consumption of ICC=8.36). Then, the calculation nodes 31, 32, . . . predict power P of a job by the following equation:

$$P = 1.02 \cdot T_{cpu} + 0.254 \cdot T_{air} + 8.36 \quad (3)$$

The job scheduling unit 240 generates an execution schedule of a newly input job. Further, when a prediction result of future power consumption of a job that is being executed is received from the management server 100, the job scheduling unit 240 determines whether the power consumption of the HPC system 30 exceeds a predetermined threshold value. For example, the job scheduling unit 240 sets the total power consumption of the job that is being executed, as the power consumption of the HPC system 30. When it is determined that the power consumption of the HPC system 30 exceeds the threshold value, the job scheduling unit 240 determines to forcibly stop a portion of jobs.

The control instruction unit 250 instructs the HPC system 30 to execute a job according to the job execution schedule generated by the job scheduling unit 240. Further, when the job scheduling unit 240 determines to forcibly stop the job, the control instruction unit 250 instructs the HPC system 30 to stop the job.

The management server 100 includes a DB 110, a timer unit 120, a metrics collection unit 130, a job classification unit 140, a power comparison unit 150, a cycle analysis unit 160, a learning unit 170, a predicted value calculation unit 180, and a prediction result transmission unit 190.

The DB 110 stores information to be used for predicting a power consumption pattern of each job. The timer unit 120 manages a timing for predicting a power consumption pattern of an unexecuted job. For example, the timer unit 120 instructs the metrics collection unit 130 to collect information from the HPC operation management server 200 at a regular time interval. Further, the timer unit 120 instructs the predicted value calculation unit 180 to predict power consumption of a job that is being executed, at a regular time interval.

According to the instruction from the timer unit 120, the metrics collection unit 130 collects information from the HPC operation management server 200. For example, the metrics collection unit 130 acquires job status information of an execution waiting job and an executed job and time-series power data indicating a power consumption pattern of the executed job, from the HPC operation management server 200. The metrics collection unit 130 stores the acquired information in the DB 110.

The job classification unit 140 classifies jobs according to a predetermined classification algorithm. For example, the job classification unit 140 classifies jobs similar to each other in library referred to when a job is executed, user who requests an execution of a job, and application program corresponding to a job (hereinafter, referred to as "App"), into the same group. Further, for a newly input job, the job classification unit 140 predicts power consumption of the newly input job based on power consumption information of a job that belongs to the same group as that of the newly input job.

After the start of execution of a job, the power comparison unit 150 compares a predicted value of power consumption of the job before the start of execution and an actual measurement value of power consumption of the job after the start of execution. Then, when an error between the predicted value of the power consumption and the actual measurement value of the power consumption is equal to or more than a predetermined value, the power comparison unit 150 determines to predict the power consumption based on the actual measurement value.

When it is determined to predict the power consumption of the job that is being executed based on the actual measurement value, the cycle analysis unit 160 analyzes a cycle of the time-series variation of the power consumption, based on power consumption information of another executed job in the group to which the job that is being executed belongs. For example, the cycle analysis unit 160 includes a job analysis unit 161 and a cycle comparison unit 162. The job analysis unit 161 divides a time period of acquisition of power consumption information of a job, into a predetermined number of time periods, and analyzes a variation cycle of power consumption for each divided time period (cycle determination time period). The cycle comparison unit 162 compares the cycles of the respective cycle determination time periods, and establishes a cycle of a cycle determination time period that satisfies a predetermined condition. When there exists a cycle determination time period of which cycle is not established, the job analysis unit 161 further finely divides the corresponding time period to obtain cycles, and the cycle comparison unit 162 establishes cycles.

The learning unit 170 generates a learning model for predicting future power consumption from past power consumption information of a job, using a neural network. For example, the learning unit 170 generates learning models for each group of jobs. When learning models of each group are generated, the learning unit 170 generates a learning model for each time period with a consistent variation cycle of power consumption in the corresponding group. Further, when learning models are generated, the learning unit 170 generates a learning model using a delay time corresponding to a cycle of a learning model generation target time period (time indicating a time period whose actual measurement values of power consumption are used for the prediction). In addition, the learning unit 170 may generate a plurality of learning models for different times from a current timing up to a power consumption prediction target timing, in one learning model generation target time period of one group. For example, the learning unit 170 may generate a learning model for predicting power consumption of future 5 minutes, and a learning model for predicting power consumption of future 10 minutes.

The predicted value calculation unit 180 predicts a time-series variation of future power consumption of a job that is being executed, using a prediction model at a timing instructed by the timer unit. For example, the predicted value calculation unit 180 predicts the power consumption by using a learning model of a time period corresponding to the current execution time of a power consumption prediction target job, in the group to which the corresponding job belongs. In addition, when there exists a plurality of learning models for the corresponding time period (different in future time of which power consumption is predicted), the predicted value calculation unit 180 uses a prediction model with the highest accuracy.

The prediction result transmission unit 190 transmits a prediction result of power consumption of an unexecuted job and a prediction result of power consumption of a job that is being executed, to the HPC operation management server 200.

In addition, the lines that connect the components to each other as illustrated in FIG. 5 represent a portion of communication paths, and a communication path other than the illustrated communication paths may be set. In addition, the function of each component illustrated in FIG. 5 may be implemented by, for example, causing a computer to execute a program module corresponding to the component.

Figure 6:
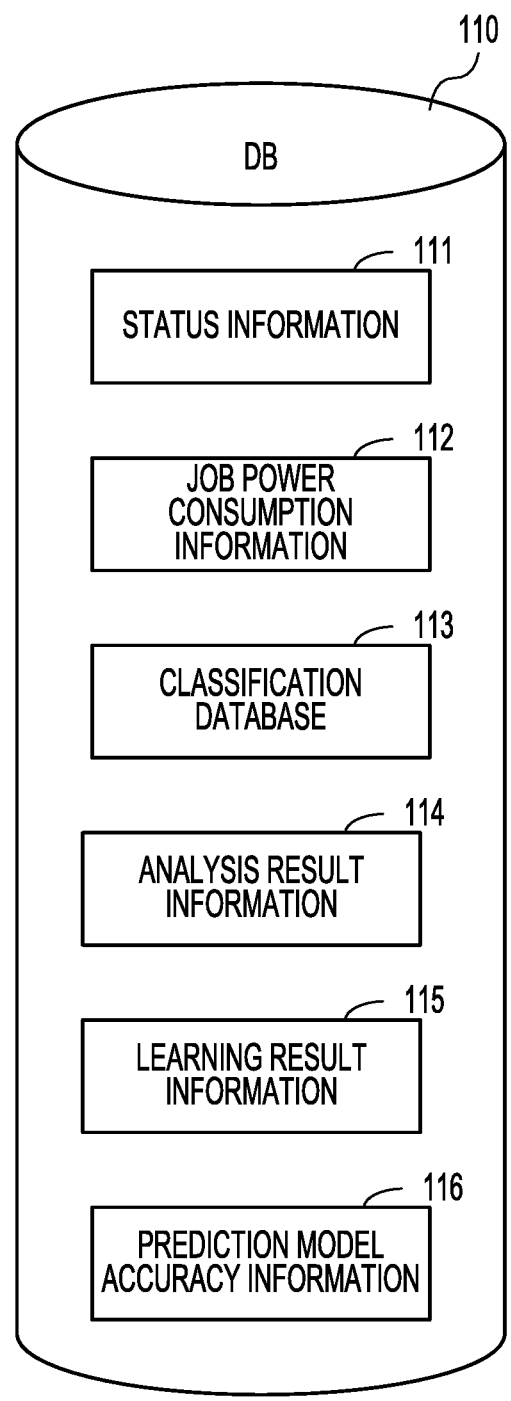
FIG. 6 is a diagram illustrating an example of information stored in a DB of the management server.

FIG. 6 is a diagram illustrating an example of information stored in the DB of the management server. In the example of FIG. 6, the DB 110 stores status information 111, job power consumption information 112, a classification database 113, analysis result information 114, learning result information 115, and prediction model accuracy information 116.

The status information 111 is information on a status of each job. The job power consumption information 112 is information on time-series power consumption of an executed job. The classification database 113 is a database indicating a group to which a job belongs. The analysis result information 114 is information on a fluctuation cycle of a power waveform for each time zone in each group of jobs. The learning result information 115 is information indicating a learning result of a prediction model. The prediction model accuracy information 116 is information indicating a determination result of a prediction accuracy of a generated prediction model.

Figure 7:
FIG. 7 is a view illustrating an example of status information.

FIG. 7 is a view illustrating an example of the status information. In the status information 111, each of names of jobs executed and scheduled to be executed by the HPC system 30 is set in association with a reference library name, a user name, and an App name. The reference library name is a name of a library referred to during an execution of a job (a set of programs with high general applicability). The user name is a name of a user who requests an execution of a job. The App name is a name of an App used for an execution of a job.

FIG. 8 is a view illustrating an example of the job power consumption information. The job power consumption information 112 is, for example, a data table in which an elapsed time of a job is set in a row label, and a job name is set in a column label. When a job indicated in a row is executed, power consumption of the job at a time point when a time indicated in a column elapses from the start of execution is set at a position where the row and the column intersects with each other.

Figure 9:
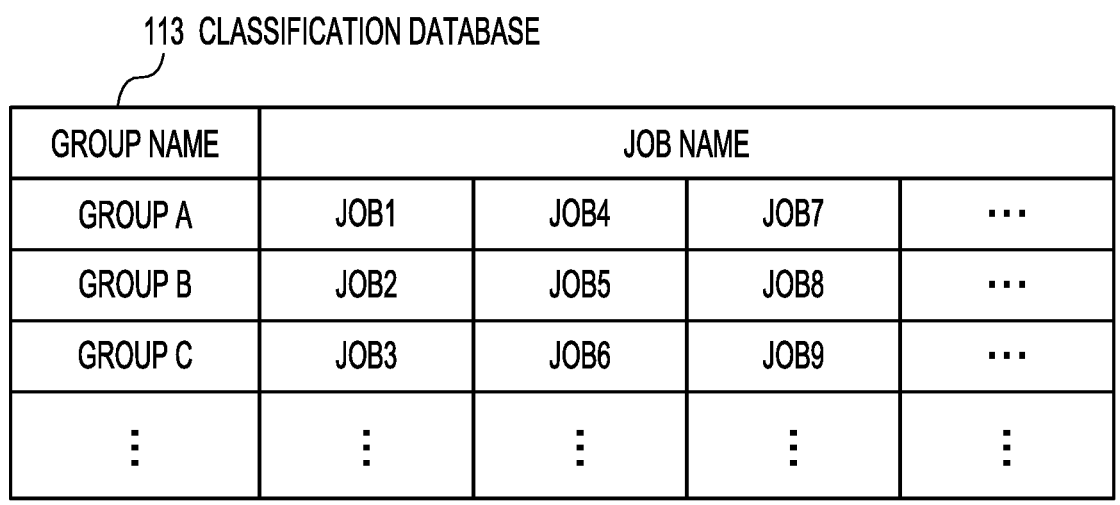
FIG. 9 is a view illustrating an example of a classification database.

FIG. 9 is a view illustrating an example of the classification database. In the classification database 113, a group name is set in association with job names of one or more jobs that belongs to the corresponding group. For example, jobs similar to each other in reference library name, user name, and App name are set in the same group. Each time a newly input job is detected, a group to which the job belongs is determined by the job classification unit 140, and the job name of the corresponding job is registered in the classification database 113.

Figure 10:
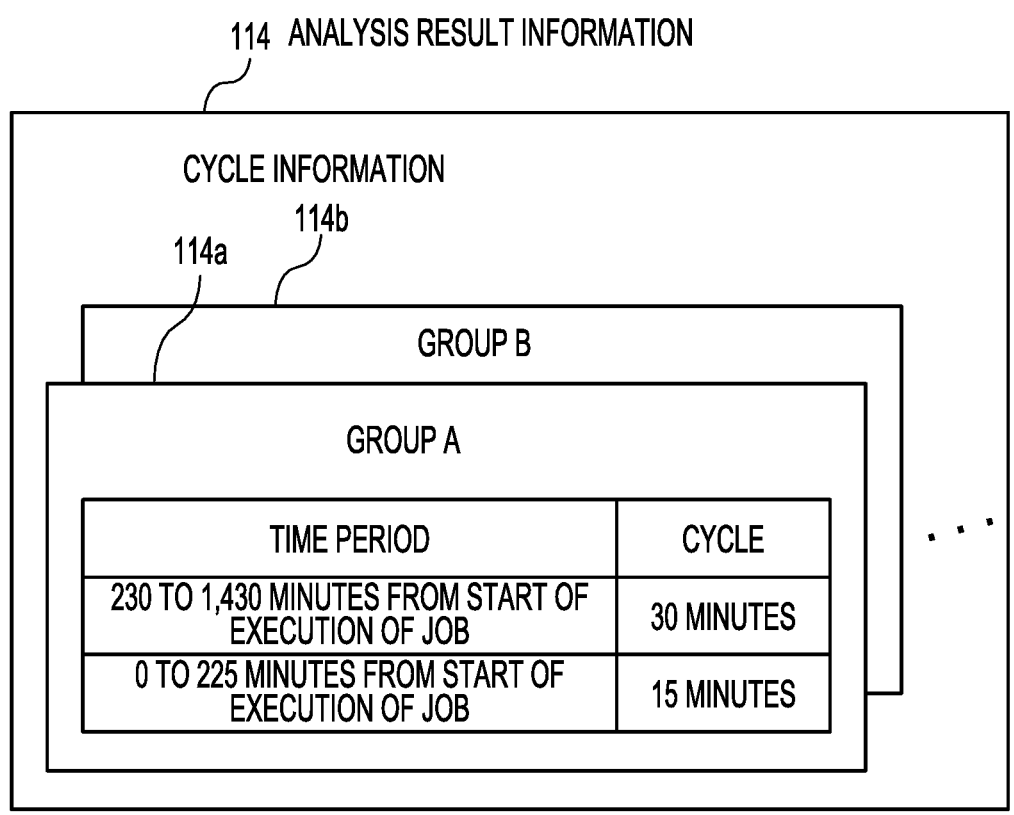
FIG. 10 is a view illustrating an example of analysis result information.

FIG. 10 is a view illustrating an example of the analysis result information. The analysis result information 114 includes cycle information (114a, 114b, . . . ) for each group. In the cycle information (114a, 114b, . . . ), a width of an elapsed time (time period) from the start of execution of a job that belongs to a corresponding group is set in association with a variation cycle of a power waveform in the corresponding time period. For example, cycle information 114a of "Group A" indicates a 15-minute cycle in a time period from 0 minutes to 225 minutes from the start of execution of a job, and a 30-minute cycle in a time period from 230 minutes to 1,430 minutes from the start of execution of the job. In addition, in the example of FIG. 10, the unit time period for determining a cycle is 5 minutes.

Figure 11:
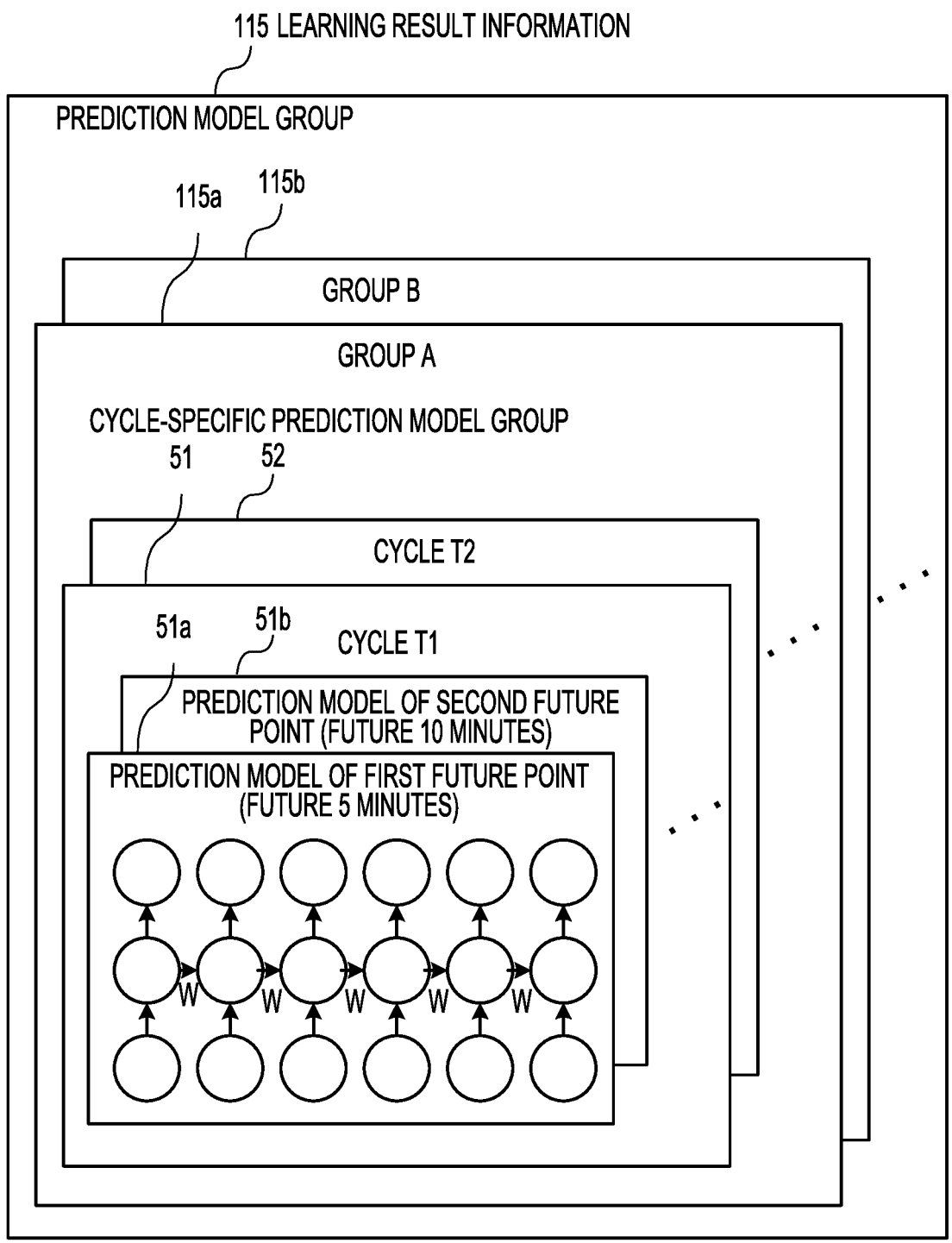
FIG. 11 is a view illustrating an example of learning result information.

FIG. 11 is a view illustrating an example of the learning result information. The learning result information 115 includes, for example, prediction model groups 115a, 115b, . . . for respective groups. Each of the prediction model groups 115a, 115b, . . . includes prediction models generated based on time-series variations of power consumptions of jobs that belong to a corresponding group. For example, a prediction model group 115a of "Group A" includes cycle-specific prediction model groups 51, 52, . . . for respective cycles represented in the analysis result information 114. Each cycle-specific prediction model group 51 includes a plurality of prediction models 51a, 51b, . . . learned at a delay time corresponding to a corresponding cycle. For example, a prediction model 51a is a learning model of a neural network for predicting power consumption of a first future point (future 5 minutes) among prediction points set with a unit time interval (5 minutes). A prediction model 51b is a learning model of a neural network (e.g., RNN) for predicting power consumption of a second future point (future 10 minutes) among the prediction points set with the unit time interval (5 minutes). The learning in the neural network indicates obtaining an appropriate value of a weight for data input to a unit corresponding to a neuron. In the learning result, the weight of learned input data is set.

Figure 12:
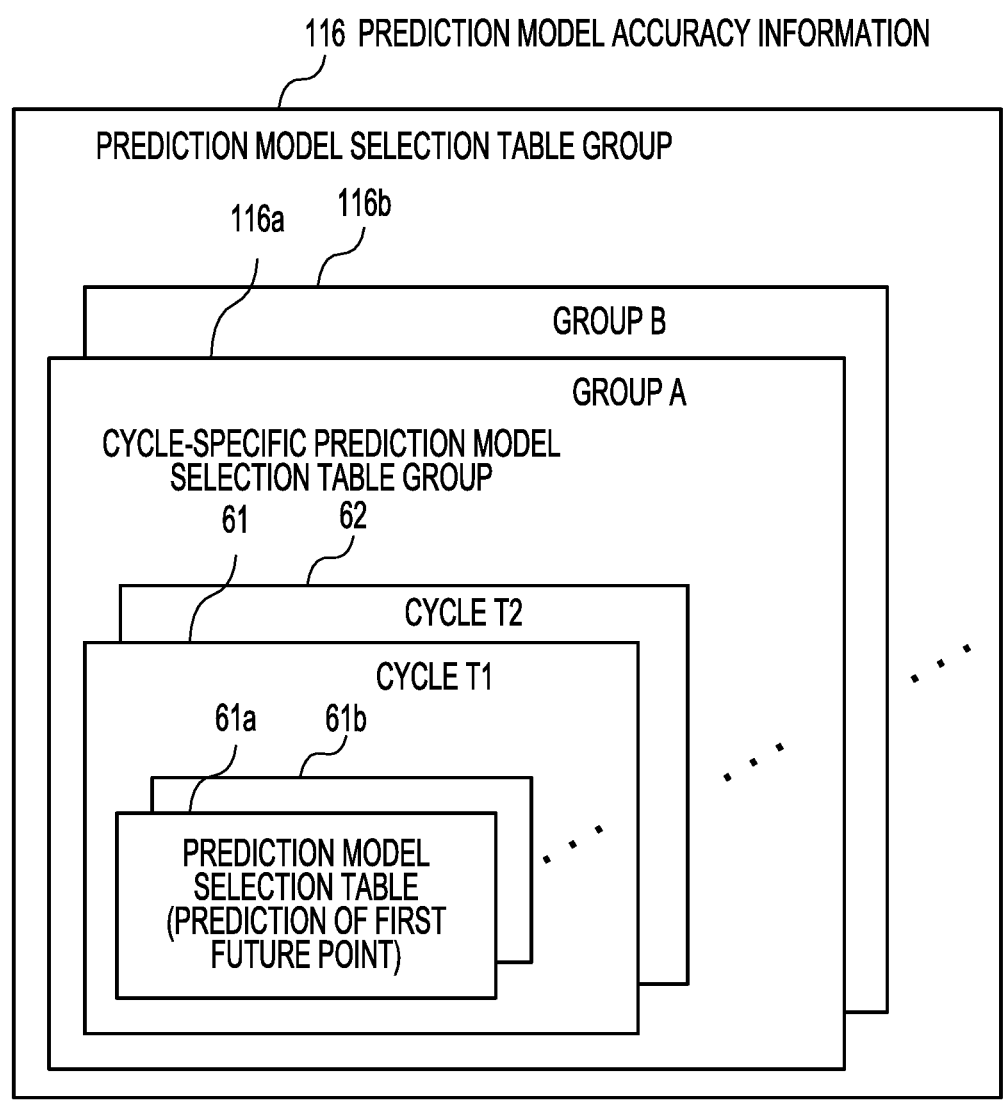
FIG. 12 is a view illustrating an example of prediction model accuracy information.

FIG. 12 is a view illustrating an example of the prediction model accuracy information. The prediction model accuracy information 116 includes, for example, prediction model selection table groups 116a, 116b, . . . . Each of the prediction model selection table groups 116a, 116b, . . . includes information indicating accuracies of prediction models generated based on time-series variations of power consumptions of jobs that belong to a corresponding group. For example, a prediction model selection table group 116a of "Group A" includes cycle-specific prediction model selection table groups 61, 62, . . . for respective cycles represented in the analysis result information 114. For example, the cycle-specific prediction model selection table group 61 includes prediction model selection tables 61a, 61b, . . . , for respective prediction target timings, that each indicate a prediction accuracy of a prediction model for predicting power of a corresponding timing. For example, when a timing every 5 minutes is a prediction target timing, the prediction target timing is represented by a timing that corresponds to a point from the timing when actual measurement values to be used for the prediction are acquired. For example, the prediction model selection table 61a indicates a prediction accuracy of each of a plurality of prediction models capable of predicting future 5 minutes (first future point). Further, the prediction model selection table 61b indicates a prediction accuracy of each of a plurality of prediction models capable of predicting future 10 minutes (second future point). The prediction model selection tables will be described in detail later (refer to FIG. 23).

The management server 100 predicts power consumption of a job using the information described above. In order to predict power, the management server 100 generates a prediction model for predicting power consumption, based on a time-series variation of power consumption of an executed job.

At this time, the management server 100 groups jobs based on the knowledge that jobs similar to each other in status information are also similar to each other in time-series variation of power consumption.

Figure 13:
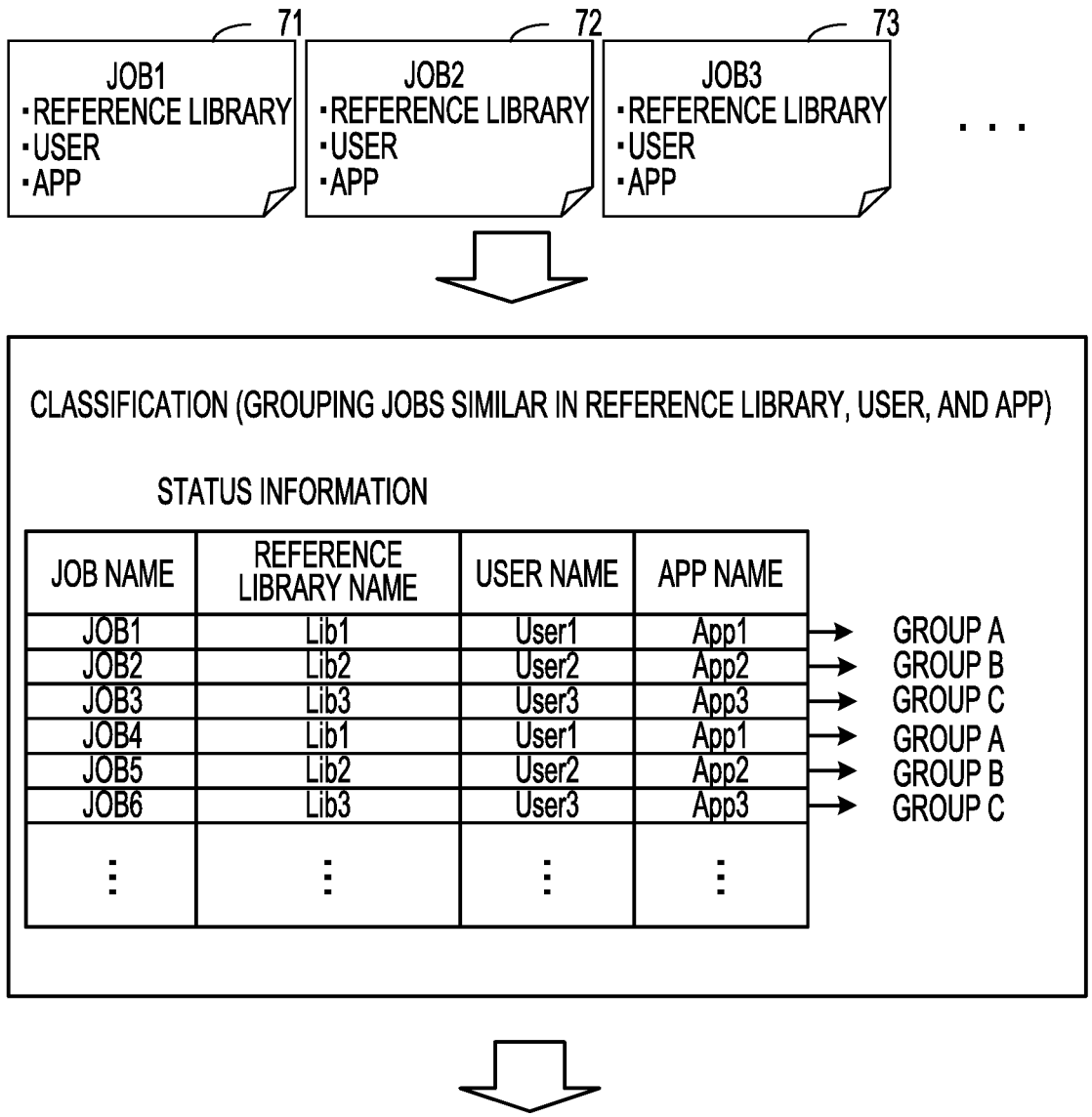
FIG. 13 is a view illustrating an example of grouping of jobs.

FIG. 13 is a view illustrating an example of the grouping of jobs. Jobs 71, 72, 73, . . . are specified with status information when the jobs are input. The status information of each of the jobs 71, 72, 73, . . . is acquired by the metrics collection unit 130 from the HPC operation management server 200, and stored in the DB 110. The job classification unit 140 refers to the status information 111 stored in the DB, and groups the jobs 71, 72, 73, . . . . For example, the job classification unit 140 groups jobs similar to each other in reference library name, user name, and App name, into the same group. In the example of FIG. 13, a job of a job name "JOB1" and a job of a job name "JOB4" have the same reference library name, user name, and App name. Thus, the job classification unit 140 classifies the job of the job name "JOB1" and the job of the job name "JOB4" into the group of the group name "Group A." Then, the job classification unit 140 sets the classification result in the classification database 113 within the DB 110.

Further, based on the classification database 113, the job classification unit 140 classifies data indicating a time-series variation of power consumption of each job (time-series power data), for each group.

Figure 14:
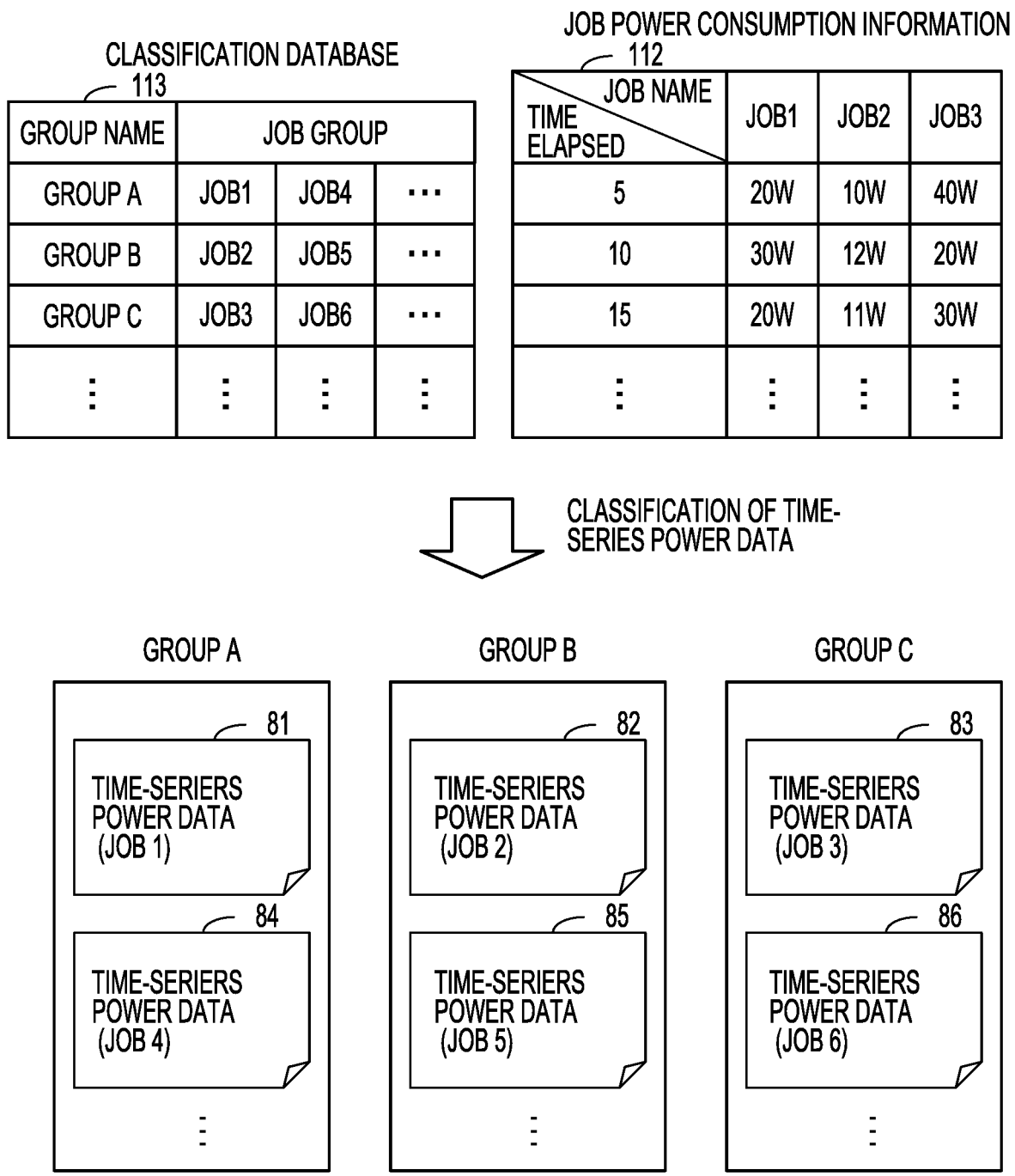
FIG. 14 is a view illustrating an example of classification of time-series power data.

FIG. 14 is a view illustrating an example of the classification of time-series power data. The DB 110 of the management server 100 stores the job power consumption information 112 acquired by the metrics collection unit 130 from the HPC operation management server 200. The power values in the respective columns of the job power consumption information 112 are time-series power data 81, 82, 83, 84, 85, 86, . . . of corresponding jobs. Based on the classification database 113, the job classification unit 140 classifies the time-series power data 81, 82, 83, 84, 85, 86, . . . of the respective jobs indicated in the job power consumption information 112, for each group.

The job classification unit 140 predicts power of a newly input job before the execution of the job, based on time-series power data of a job that was executed before the execution of the newly input job, in the group to which the newly input job belongs.

Figure 15:
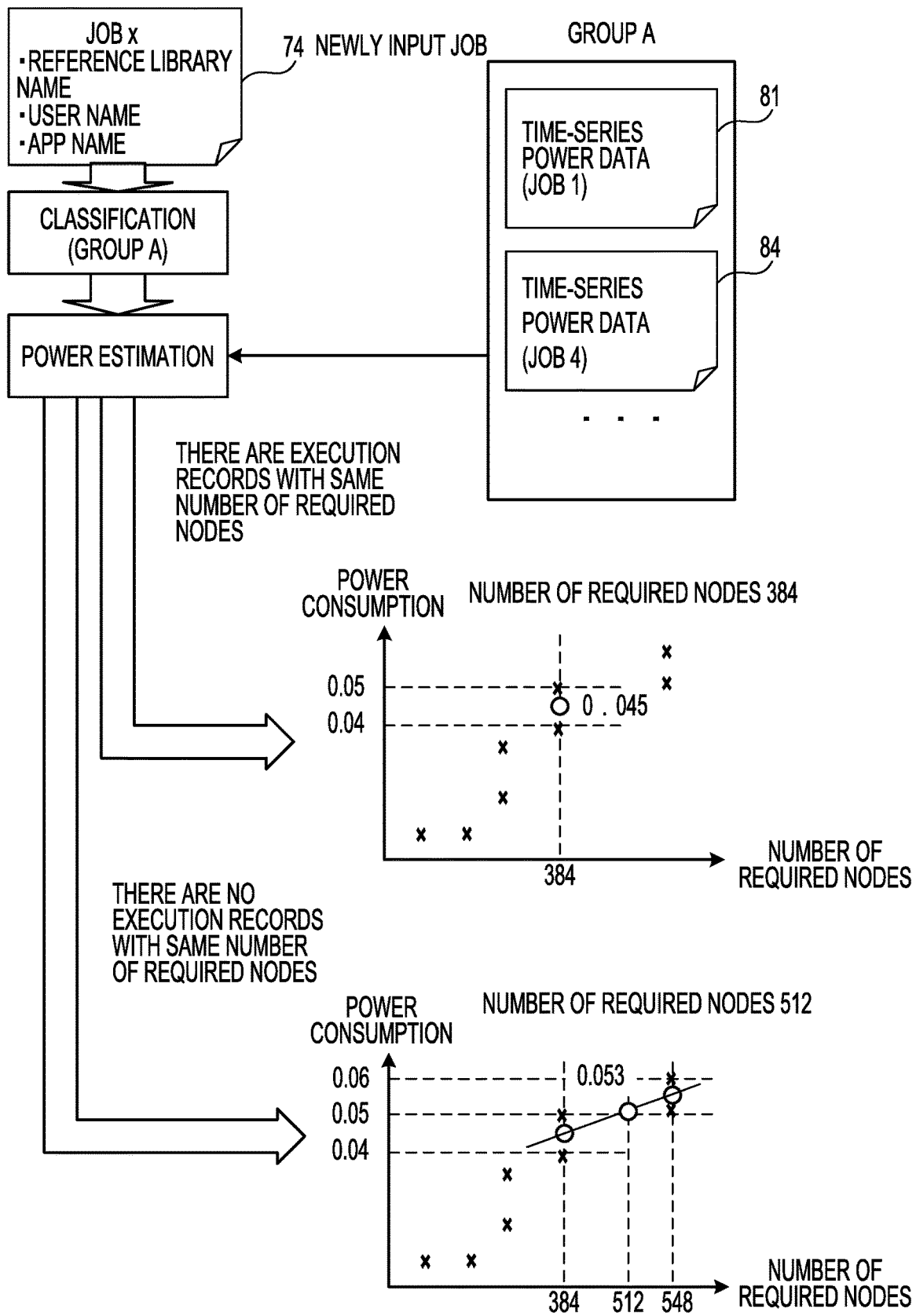
FIG. 15 is a view illustrating an example of prediction of power before an execution of a job.

FIG. 15 is a view illustrating an example of the prediction of power before an execution of a job. For example, it is assumed that a reference library name, a user name, and an App name of a newly input job 74 are the same as those of a job that belongs to "Group A." In this case, the job classification unit 140 classifies the newly input job 74 into "Group A." Then, for example, based on the number of calculation nodes to be used for the execution of the newly input job (the number of required nodes), the job classification unit 140 acquires time-series power data to be used as a reference source when the power is predicted, from the time-series power data 81, 84, . . . of the jobs that belong to "Group A."

For example, when the number of required nodes for the newly input job is "384" and there are execution records of executed jobs with the same number of required nodes, the job classification unit 140 calculates an average value of the power consumptions of the corresponding jobs as a power consumption prediction value of the newly input job. In the example of FIG. 15, there are execution records of two jobs with the same number of required nodes, and the power consumptions of the jobs at a certain time point from the start of execution of the jobs are "0.04" and "0.05." In this case, the job classification unit 140 predicts "0.045" as the power consumption of the newly input job 74.

When the number of required nodes for the newly input job is "512" and there are no execution records of executed jobs with the same number of required nodes, the job classification unit 140 sets a value obtained by interpolation using power consumptions of jobs with the relatively closer number of required nodes, as the predicted value of the power consumption of the newly input job 74. For example, the job classification unit 140 obtains an average of power consumptions of jobs with the largest number of required nodes, among jobs with a smaller number of required nodes than "512," at a prediction target time point (measurement point). In the example of FIG. 15, "0.045" is obtained as an average value of power consumptions ("0.04" and "0.05") of two jobs having "384" as the number of required nodes. Next, the job classification unit 140 obtains an average of power consumptions of jobs with the smallest number of required nodes, among jobs having a larger number of required nodes than "512," at a prediction target measurement point. In the example of FIG. 15, "0.055" is an average value of power consumptions ("0.05" and "0.06") of two jobs having "548" as the number of required nodes. The job classification unit 140 obtains a power prediction equation that passes the points indicating the obtained two average values, using a coordinate system where the horizontal axis represents the number of required nodes, and the vertical axis represents power consumption. The prediction equation for obtaining power $P_0$ is expressed by, for example, the following equation.

$$P_0 = a \cdot N_{node} + b \quad (4)$$

The $N_{node}$ represents the number of required nodes. The "a" and "b" are integers obtained by the calculation. The job classification unit 140 sets the number of required nodes of the newly input job 74 as $N_{node}$ of Equation (4), so as to predict power consumption of the newly input job 74. For example, the power consumption of the newly input job having "512" as the number of required nodes becomes "0.053," based on Equation (4).

The job classification unit 140 may calculate the prediction equation from all jobs that belong to the same group as that of the newly input job 74. For example, the job classification unit 140 generates a power prediction equation indicating the relationship between the number of required nodes and power consumption at each prediction target measurement point, based on actual measurement values of power consumptions of executed jobs that belong to the same group as that of the newly input job 74, using the least square method. When a prediction equation is calculated from all jobs, the power consumption of the newly input job 74 may be predicted even in a case where either one of an executed job with a larger number of required nodes than that of the newly input job 74, or an executed job with a smaller number of required nodes than that of the newly input job 74 does not exist.

The job classification unit 140 obtains the predicted value of the power consumption illustrated in FIG. 15, for each measurement point with a predetermined time interval (e.g., 5-minute interval) from the start of execution of the newly input job 74. By sequentially arranging the power consumption obtained for each measurement point, a power waveform indicating the time-series variation of the power consumption of the newly input job 74 may be obtained.

The prediction result of the power consumption of the newly input job 74 is transmitted by the prediction result transmission unit 190 to the HPC operation management server 200. In the HPC operation management server 200, the job scheduling unit 240 performs a job scheduling based on the prediction result of the power consumption, such that, for example, the entire power consumption of the HPC system 30 does not exceed a predetermined value.

The newly input job 74 is executed by the HPC system 30 according to the schedule. When the execution of the newly input job 74 is started, an actual measurement value of the power consumption of the newly input job 74 is sequentially measured by the HPC system 30. The measured power consumption of the newly input job 74 is stored in the DB 210 by the information acquisition unit 230 of the HPC operation management server 200. Then, the metrics collection unit 130 of the management server 100 acquires the actual measurement value of the power consumption of the newly input job 74 from the DB 210, and stores the actual measurement value in the DB 110.

When the actual measurement value of the power consumption of the newly input job 74 is obtained, the power comparison unit 150 of the management server 100 compares the actual measurement value of the power consumption with the predicted value obtained by the job classification unit 140.

Figure 16:
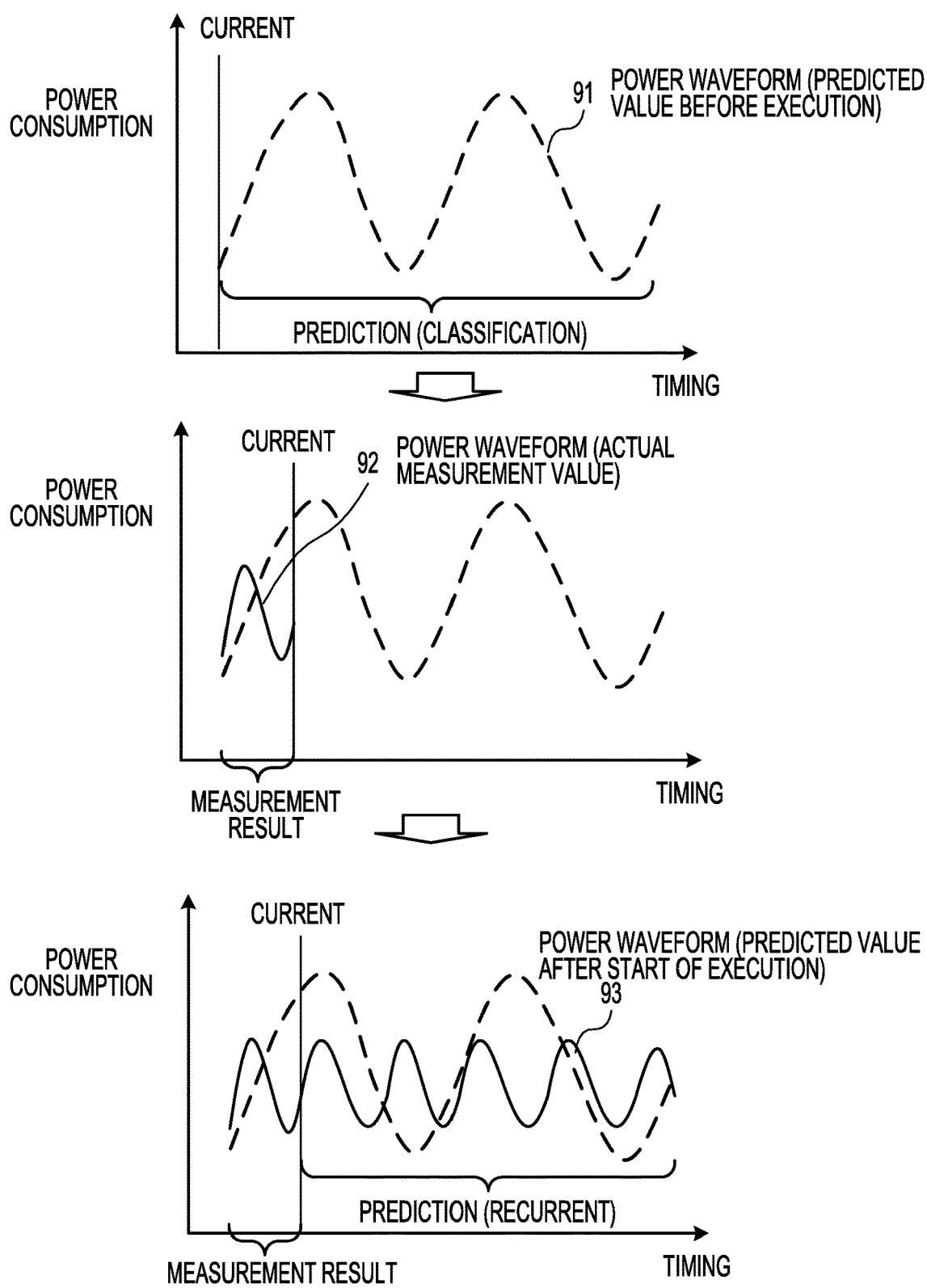
FIG. 16 is a view illustrating an example of comparison between an actual measurement value and a predicted value of power consumption.

FIG. 16 is a view illustrating an example of the comparison between the actual measurement value of the power consumption and the predicted value. Based on the classification result of jobs, the job classification unit 140 predicts the power consumption of the newly input job during the time period of the execution of the newly input job, before the execution of the newly input job. The predicted power consumption is represented by a power waveform 91.

Then, when the execution of the newly input job is started so that the newly input job becomes a job that is being executed, the actual measurement value of the power consumption of the job that is being executed is obtained. The power comparison unit 150 generates a power waveform 92 based on the obtained actual measurement value. Then, the power comparison unit 150 calculates an error between the predicted power waveform 91 and the actually measured power waveform 92. For example, for each obtained actual measurement value, the power comparison unit 150 calculates a difference from the predicted value of the power consumption at the same timing as that of the actual measurement value, and determines whether an average of the differences is equal to or more than a predetermined value. When it is determined that the average of the differences is equal to or more than a predetermined value, the power comparison unit 150 determines that the prediction result of the power consumption prediction before the execution is inaccurate, and instructs the cycle analysis unit 160 to calculate a cycle of a time-series variation of power consumption for each time period of the group to which the job that is being executed belongs.

Then, through the processes by the cycle analysis unit 160, the learning unit 170, and the predicted value calculation unit 180, future power consumption of the job that is being executed is predicted using a recurrent method based on the actual measurement value of the power consumption. As a result, a new power waveform 93 is obtained.

For predicting future power consumption based on the actually measured power consumption, for example, a learning model learned by the RNN is used. The learning model is generated by the learning unit 170, for example, for each group.

Figure 17:
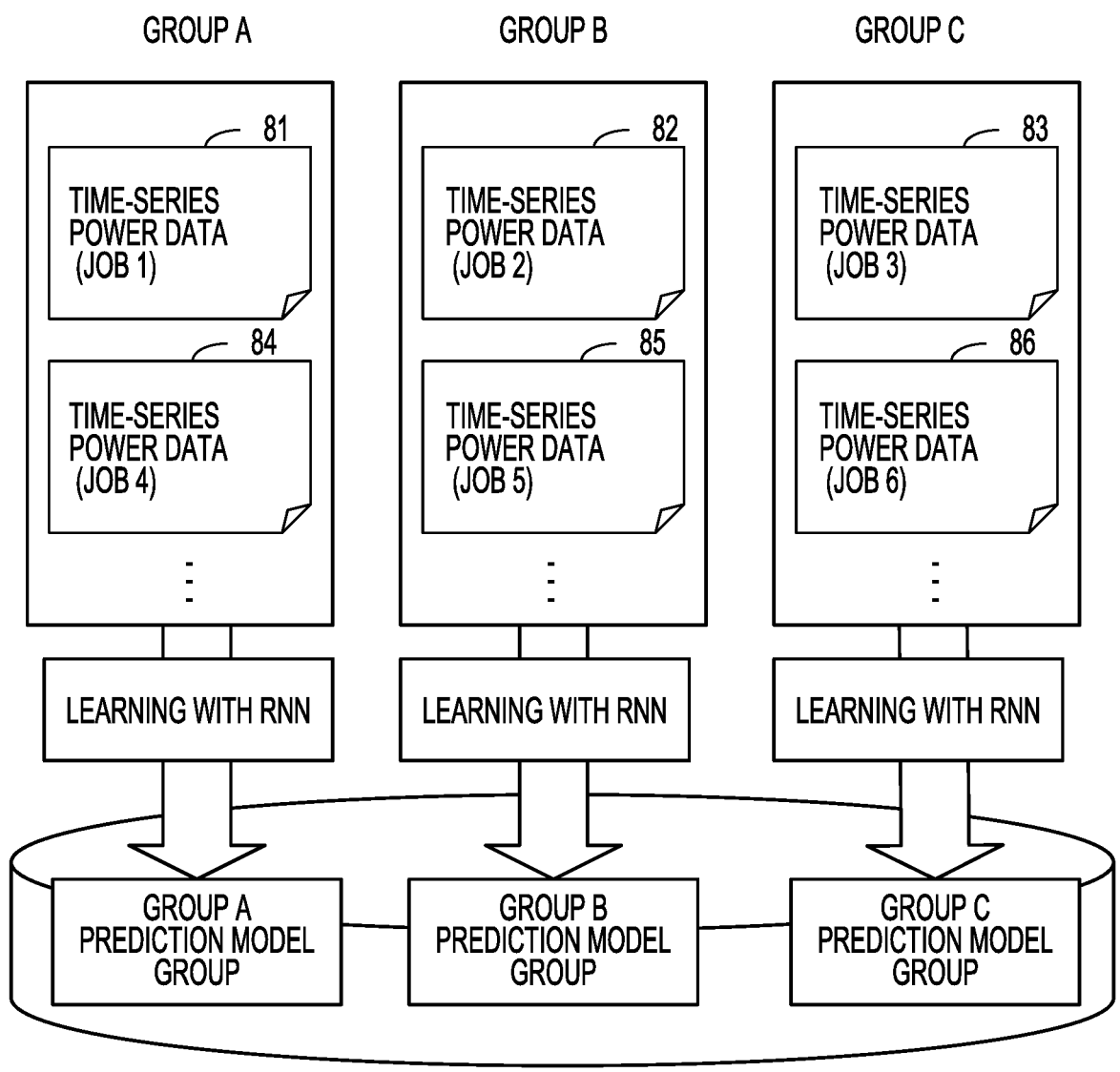
FIG. 17 is a view illustrating an outline of a process of generating a learning model.

FIG. 17 is a view illustrating an outline of the process of generating a learning model. For example, the learning unit 170 performs an RNN learning for each time period with a consistent cycle, based on the time-series power data 81, 84, . . . of the jobs that belong to "Group A," so as to generate a prediction model group of "Group A." Further, the learning unit 170 performs an RNN learning for each time period with a consistent cycle, based on the time-series power data 82, 85, . . . of the jobs that belong to "Group B," so as to generate a prediction model group of "Group B." Further, the learning unit 170 performs an RNN learning for each time period with a consistent cycle, based on the time-series power data 83, 86, . . . of the jobs that belong to "Group C," so as to generate a prediction model group of "Group C."

Figure 18:
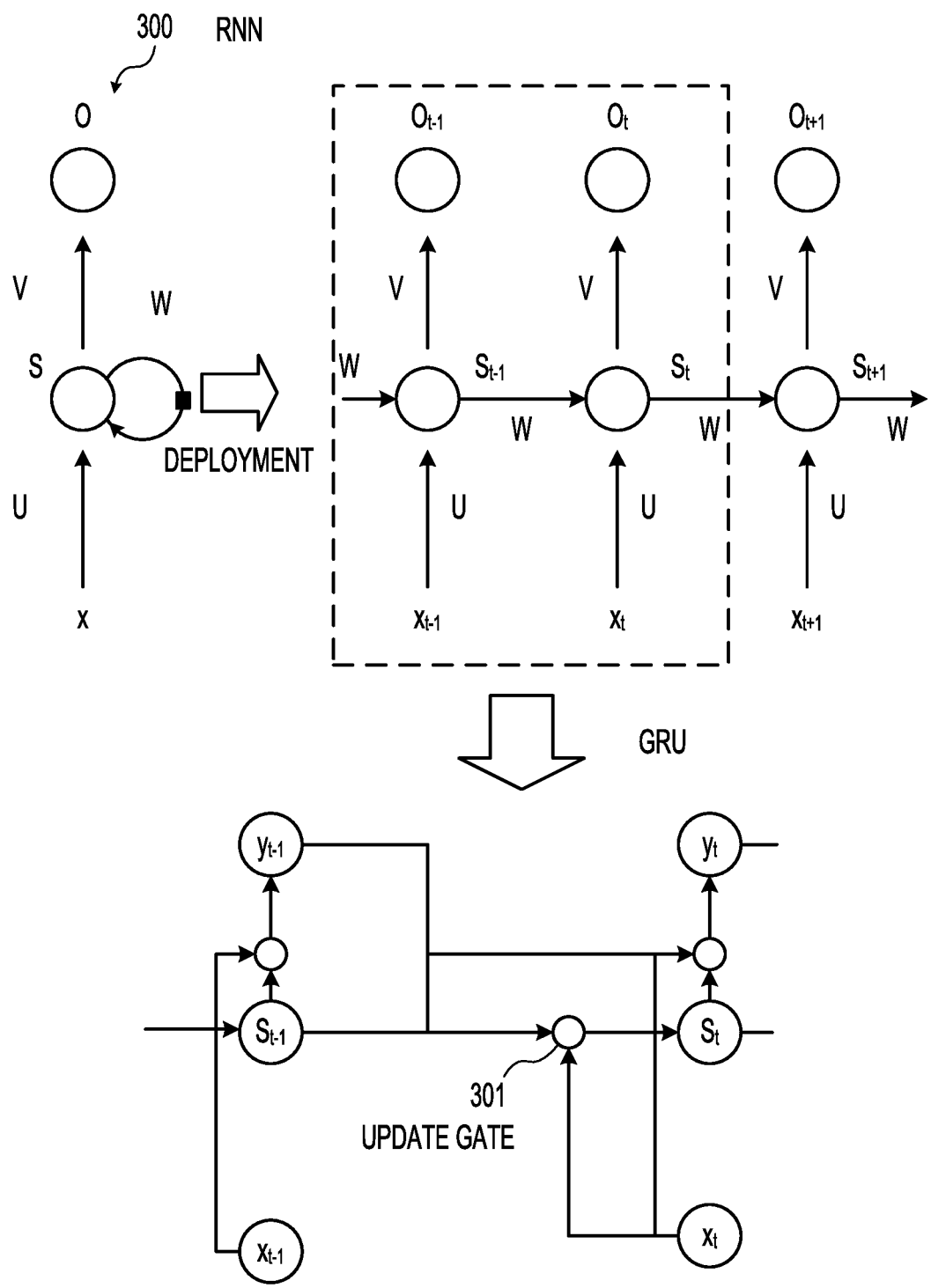
FIG. 18 is a view for explaining an RNN (recurrent neural network)

FIG. 18 is a view for explaining the RNN. An RNN 300 is a kind of a neural network, and is used for a learning of time-series data. In the RNN, the contents of a hidden layer at a timing "t" are treated as an input at the next timing t+1.

The RNN 300 is an LSTM (long short term memory network) or a GRU (gated recurrent unit).

The LSTM introduces a mechanism of a gate and is able to store events up to the distant past. Thus, the LSTM is useful for matters that may not be predicted without referring to past information. The GRU is an improvement of the LSTM. The GRU is improved by simplifying the structure of the LSTM, and combines a forget gate and an input gate as a single update gate 301.

In the update gate 301, it may be set how old past information is to be used. In the RNN 300, the matter as to how old past information is to be used is set as a delay time. The delay time is a hyperparameter that determines how old past information is to be used in order to perform a learning/prediction, with respect to a prediction target measurement point.

Figure 19:
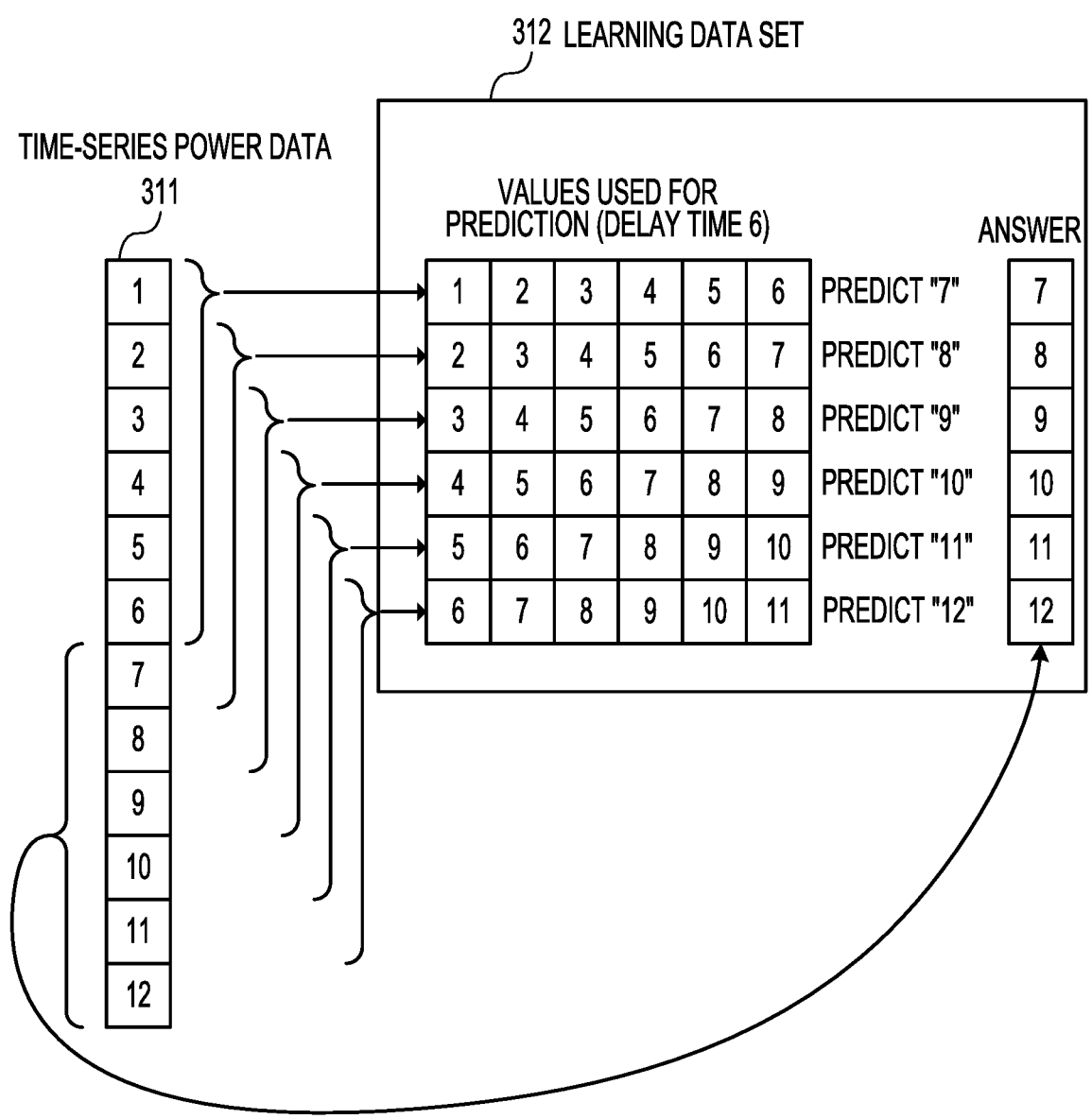
FIG. 19 is a view illustrating an example of a learning data set for the RNN according to a delay time.

FIG. 19 is a view illustrating an example of a learning data set for the RNN according to a delay time. FIG. 19 represents an example where a delay time is "6."

The time-series power data 311 of a job includes power consumption values (actual measurement values) of the job that are measured at a predetermined time interval (e.g., every 5 minutes). Each rectangle of the time-series power data 311 represents the actual measurement values, and the numerals in the rectangle indicate the sequential order of measurement. The learning unit 170 generates a learning data set 312 based on the time-series power data 311.

For example, the first row of the learning data set 312 represents using first to sixth actual measurement values to predict seventh power. A seventh actual measurement value is an answer to the prediction. That is, when a difference between the prediction result obtained from a prediction model using the first to sixth actual measurement values and the seventh actual measurement value is equal to or less than a predetermined value, the prediction result is correct.

Similarly, an eighth power is predicted using the second to seventh actual measurement values, and an eighth actual measurement value is an answer. A ninth power is predicted using the third to the eighth actual measurement values, and a ninth actual measurement value is an answer. A tenth power is predicted using the fourth to ninth actual measurement values, and a tenth actual measurement value is an answer. An eleventh power is predicted using the fifth to tenth actual measurement values, and an eleventh actual measurement value is an answer. A twelfth power is predicted using the sixth to eleventh actual measurement values, and a twelfth actual measurement value is an answer.

The learning unit 170 shapes the time-series power data 311 as illustrated in FIG. 19, and generates the learning data set 312. The learning unit 170 performs the generation of the learning data set 312 for each job.

With respect to the interval for measuring power, FIG. 19 assumes a case where power of the next measurement point from the actual measurement values used for the prediction (e.g., future 5 minutes) is measured. However, the learning unit 170 may generate a prediction model for predicting power of the further future.

Figure 20:
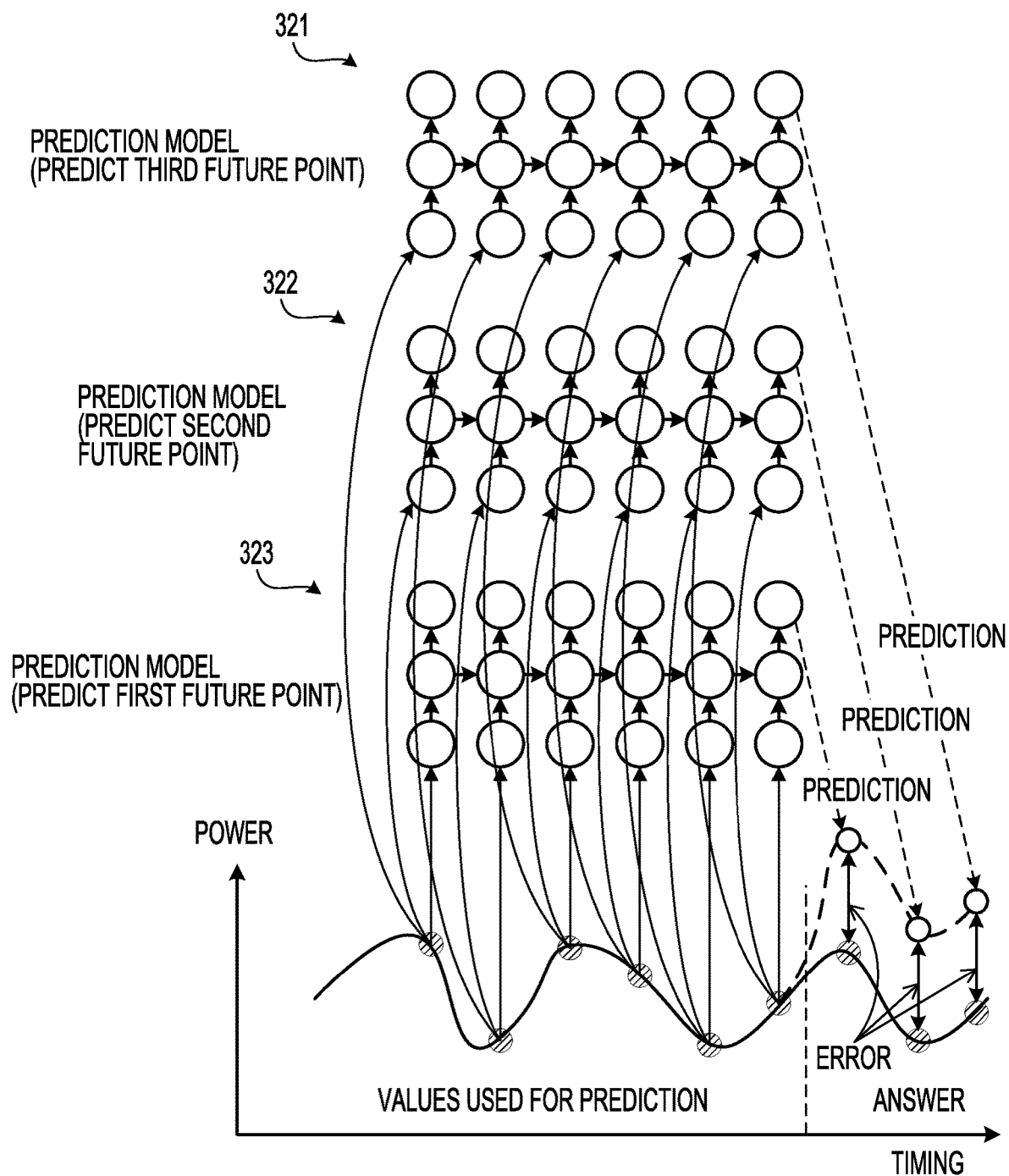
FIG. 20 is a view illustrating an example of a plurality of prediction models for different times up to a future prediction timing.

FIG. 20 is a view illustrating an example of a plurality of prediction models for different times up to a future prediction timing. The example of FIG. 20 represents a prediction model 321 that predicts power of a measurement point of a third future point, a prediction model 322 that predicts power of a measurement point of a second future point, and a prediction model 323 that predicts power of a measurement point of a first future point.

The learning unit 170 performs the prediction by reading time-series power data of an executed job in a sequential order, and learns an error from an actual measurement value. For example, the learning unit 170 learns an error between an actual measurement value and a predicted value, by using a BPTT (back-propagation through time) algorithm. The BPTT performs a back propagation of the weight of the neural network in the time direction.

The learning unit 170 independently generates a prediction model for each of a plurality of measurement points (e.g., future 5, 10, 15, 20, 25, and 30 minutes) after the time zone when data to be used for a prediction are acquired. Then, the learning unit 170 applies a prediction result obtained from each model using the same past power time-series data as a corresponding future prediction point, so as to calculate an error from an actual measurement value and performs the learning using the back-propagation method and the BPTT.

In a case where a plurality of prediction models is generated through the learning, when actual measurement values of power consumption of a job that is being executed are acquired, the calculation unit 180 is able to predict the power consumption of the corresponding job at a plurality of measurement points.

Figure 21:
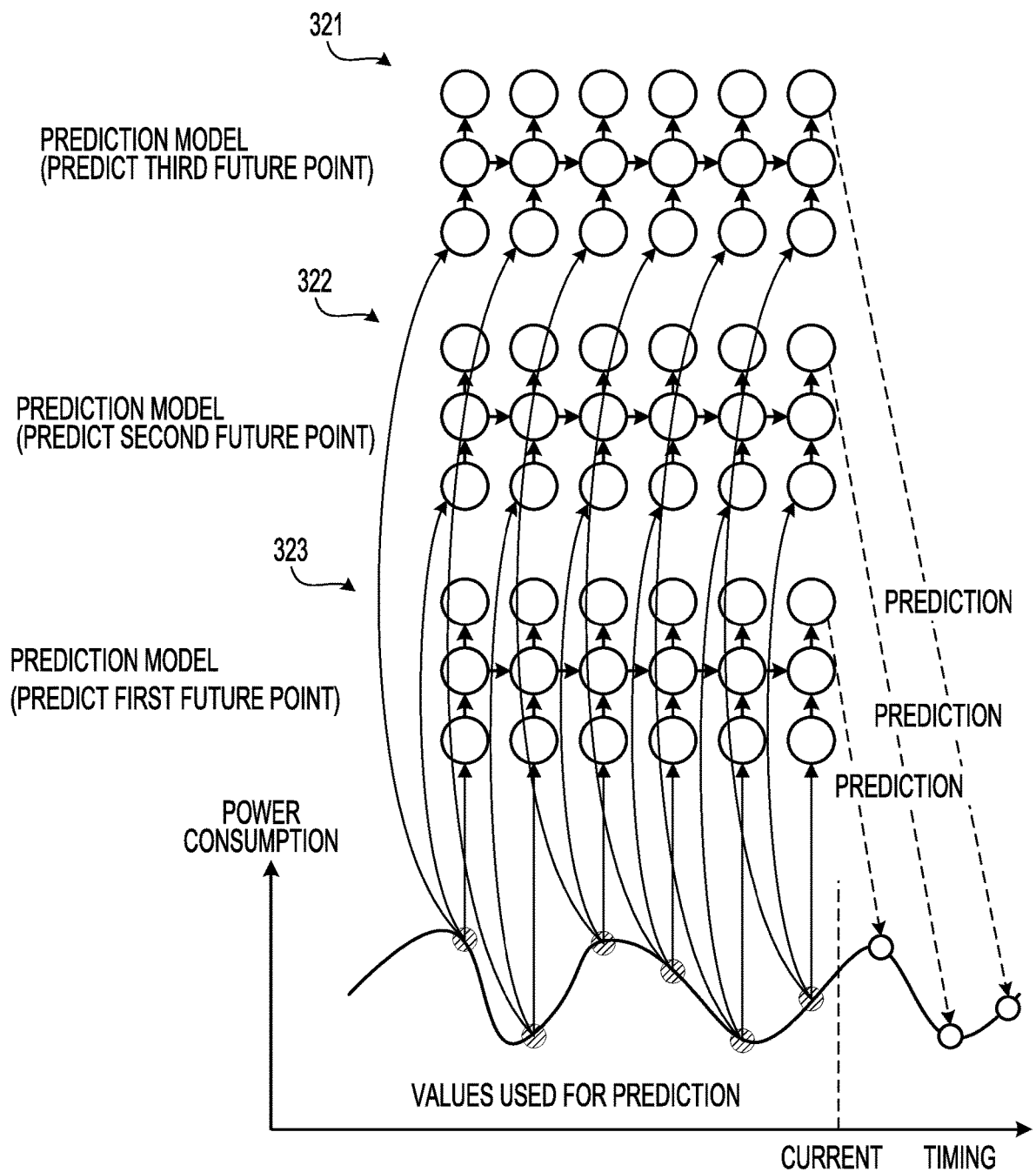
FIG. 21 is a view illustrating an example of prediction of power consumptions of multiple measurement points by multiple prediction models.

FIG. 21 is a view illustrating an example of the prediction of power consumption at a plurality of measurement points by a plurality of prediction models. As illustrated in FIG. 21, the predicted value calculation unit 180 is able to predict power consumptions of a first future point, a second future point, and a third future point using the plurality of prediction models 321 to 323. When time elapses so that an actual measurement value of the power consumption of the first future point is obtained, the predicted value calculation unit 180 is able to predict power consumptions of a subsequent first future point, second future point, and third future point, using the plurality of prediction models 321 to 323.

When a plurality of prediction models for different times up to the future prediction timing is generated, there may exist a plurality of prediction models usable for predicting power of a certain measurement point.

Figure 22:
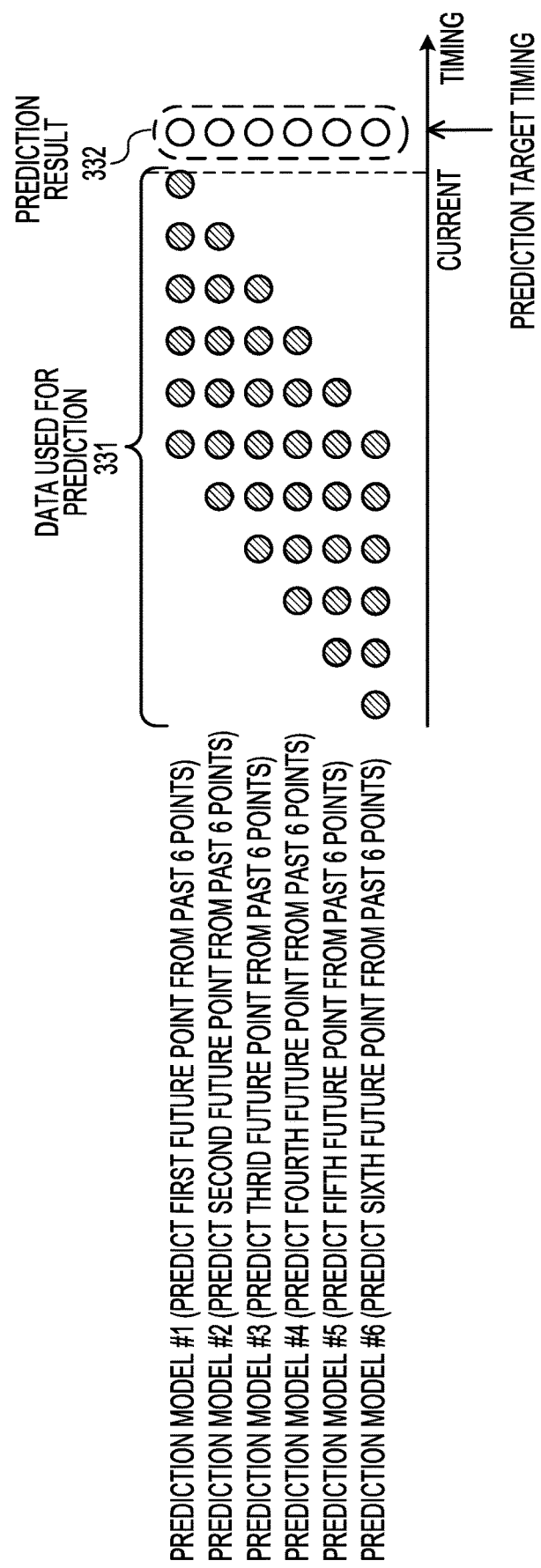
FIG. 22 is a view illustrating an example where there are multiple prediction models usable for prediction of power of a prediction target timing.

FIG. 22 is a view illustrating an example where there exists a plurality of prediction models usable for predicting power of a prediction target timing. In FIG. 22, data to be used for a prediction 331 are indicated by black circles, and a prediction result 332 is indicated by a white circle. In a case where prediction models for predicting powers of measurement points of first to sixth future points are generated, there exist six models that currently predict the first future point.

When there is a plurality of prediction models for a prediction target measurement point, the predicted value calculation unit 180 selects a prediction model with the highest accuracy based on a comparison between a past prediction result and an actual measurement result, and employs a prediction result selected by the prediction model. For example, for a plurality of prediction models capable of predicting a prediction target measurement point, the predicted value calculation unit 180 predicts power consumption of a new prediction target measurement point, and each time an actual measurement value of the prediction target measurement point is obtained, the predicted value calculation unit 180 compares the obtained actual measurement value and the prediction result of the latest predetermined time period, so as to calculate an RMSE (root mean square error). Then, the predicted value calculation unit 180 additionally registers the newly calculated RMSE of each of the plurality of prediction models in the prediction model selection table. Then, the predicted value calculation unit 180 refers to the updated prediction model selection table, and selects a prediction model with the highest accuracy (small difference) as a prediction model to be used for the next prediction.

FIG. 23 is a view illustrating an example of the prediction model selection table. In a prediction model selection table 61a, for example, a timing when the RMSE is calculated is set in association with a mean square error between a predicted value and an actual measurement value for each prediction model. As the RMSE value is small, the error is small. For example, when power is predicted at a specific timing, the predicted value calculation unit 180 employs a prediction result of a prediction model having the smallest sum of calculated RMSEs, among prediction models usable for predicting power at the corresponding timing.

In addition, in the examples illustrated in FIGS. 19 to 23, the delay time is "6." However, the delay time may be set to be relatively longer or shorter. In a case where the RNN 300 is used for predicting power consumption of a job, when the delay time is set to be relatively longer, more actual measurement values may be used to perform a prediction, so that the improvement of prediction accuracy may be expected. However, when the delay time is set to be excessively long, even information obtained when a behavior different from the current behavior of power consumption occurs may be used, and as a result, the prediction accuracy may be degraded. Further, when the delay time is set to be excessively long, an adverse effect may occur in that the calculation time for learning and prediction becomes long. Thus, when the periodicity is recognized in a time-series variation of power consumption of a job, it is considered that the optimum value of the delay time in the RNN is one cycle of cycles of a power waveform. That is, when a power waveform varies periodically, a repeated time-series variation of power may be accurately predicted using time-series power data corresponding to one cycle. Hence, the cycle analysis unit 160 determines a cycle of a time-series variation of power for each group. For the determination of a cycle, a correlation coefficient of autocorrelation may be used.

Figure 24:
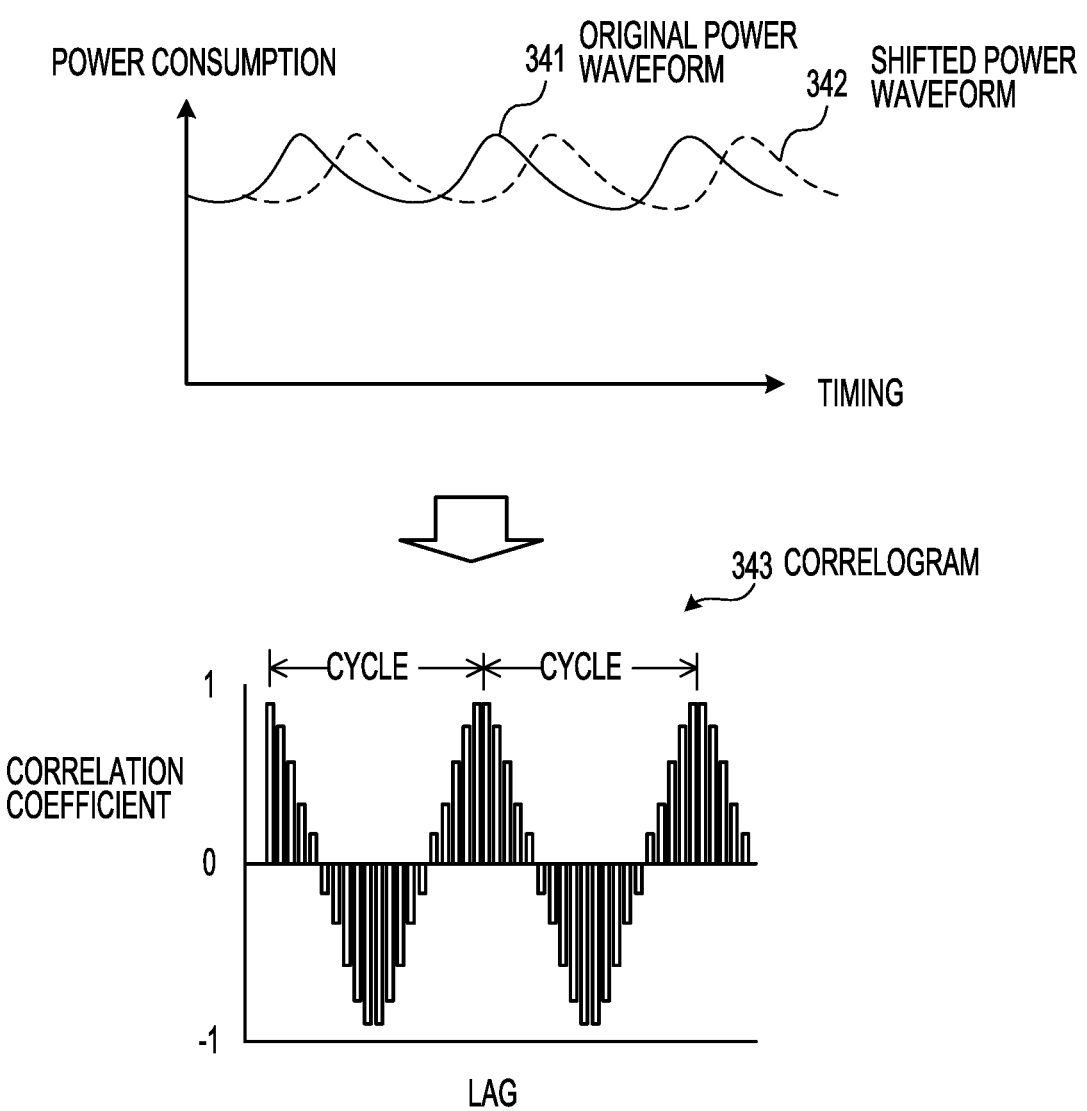
FIG. 24 is a view illustrating an example of determination of a cycle using a correlation coefficient of autocorrelation.

FIG. 24 is a view illustrating an example of the determination of a cycle using a correlation coefficient of autocorrelation. The correlation coefficient of autocorrelation is a correlation coefficient between data of an original power waveform 341 and data of a power waveform 342 which is shifted from the original power waveform 341 in the timing axis direction by a predetermined time. When the number of data points of power values representing the original power waveform 341 is "n" (n is an integer of 1 or more), a correlation coefficient of autocorrelation $r_{xy}$ may be calculated by the following equation.

$$r_{xy} = \frac{\frac{1}{n}\sum_{i=1}^{n}(x_i - \bar{x})(y_i - \bar{y})}{\sqrt{\frac{1}{n}\sum_{i=1}^{n}(x_i - \bar{x})^2} \times \sqrt{\frac{1}{n}\sum_{i=1}^{n}(y_i - \bar{y})^2}} \quad (5)$$

The "$x_i$" is data of an i-th power value representing the original power waveform 341 (i=1, 2, ..., n). The "y" is data of an i-th power value representing the power waveform 342 shifted in the timing axis direction. The "x" with an overline is an arithmetic mean of $x_i$. The "y" with an overline is an arithmetic mean of $y_i$.

In the upper graph of FIG. 24, since the same shape is repeated three times, a periodicity is seen in the power variation. The job analysis unit 161 generates the power waveform 342 shifted from the original power waveform 341 in the timing axis direction by a predetermined amount, and calculates a correlation coefficient between the original power waveform 341 and the shifted power waveform 342. In addition, the amount of shift in the timing axis direction is called lag. For example, the job analysis unit 161 gradually increases the lag, and calculates a correlation coefficient of autocorrelation each time the lag is increased. Then a correlogram 343 may be generated. The correlogram 343 is a graph which sets the amount of shift (lag) from the original data on the horizontal axis, and a calculated correlation coefficient on the vertical axis. Referring to the correlogram 343, a position where the correlation coefficient becomes a peak (local maximum value) appears at a predetermined interval. The job analysis unit 161 determines the interval between the positions where the correlation coefficient becomes a peak, to be a cycle of a power waveform. In addition, for example, when a correlation coefficient of a certain lag value is higher than previous and subsequent correlation coefficients, the job analysis unit 161 determines the lag value to be a peak position.

In addition, depending on jobs, it may be difficult to detect a correct cycle when a cycle of a time-series variation of power consumption is obtained using an average value of the peak intervals of the correlogram 343. For example, when a periodicity partially appears or when a cycle changes in the meantime, it may be difficult to detect an appropriate cycle. When an incorrect cycle is detected and power consumption is predicted based on the cycle, the prediction accuracy is degraded.

Thus, the cycle analysis unit 160 divides certain time-series power data in an N number of division units (N is an integer of 2 or more) in the timing axis direction, and calculates a correlation coefficient of autocorrelation for each divided time period. The cycle analysis unit 160 sets the initial value of the number of division units N to 2, and repeats determining whether cycles of the respective divided time periods are consistent with each other, and increasing the number of division units. Each time the number of division units N is increased, the cycle analysis unit 160 determines a cycle for each divided time period by the calculation of a correlation coefficient of autocorrelation, and compares cycles of the respective time periods. As a result, it is possible to calculate an appropriate cycle for each divided time period of a power waveform represented by time-series power data.

Figure 25:
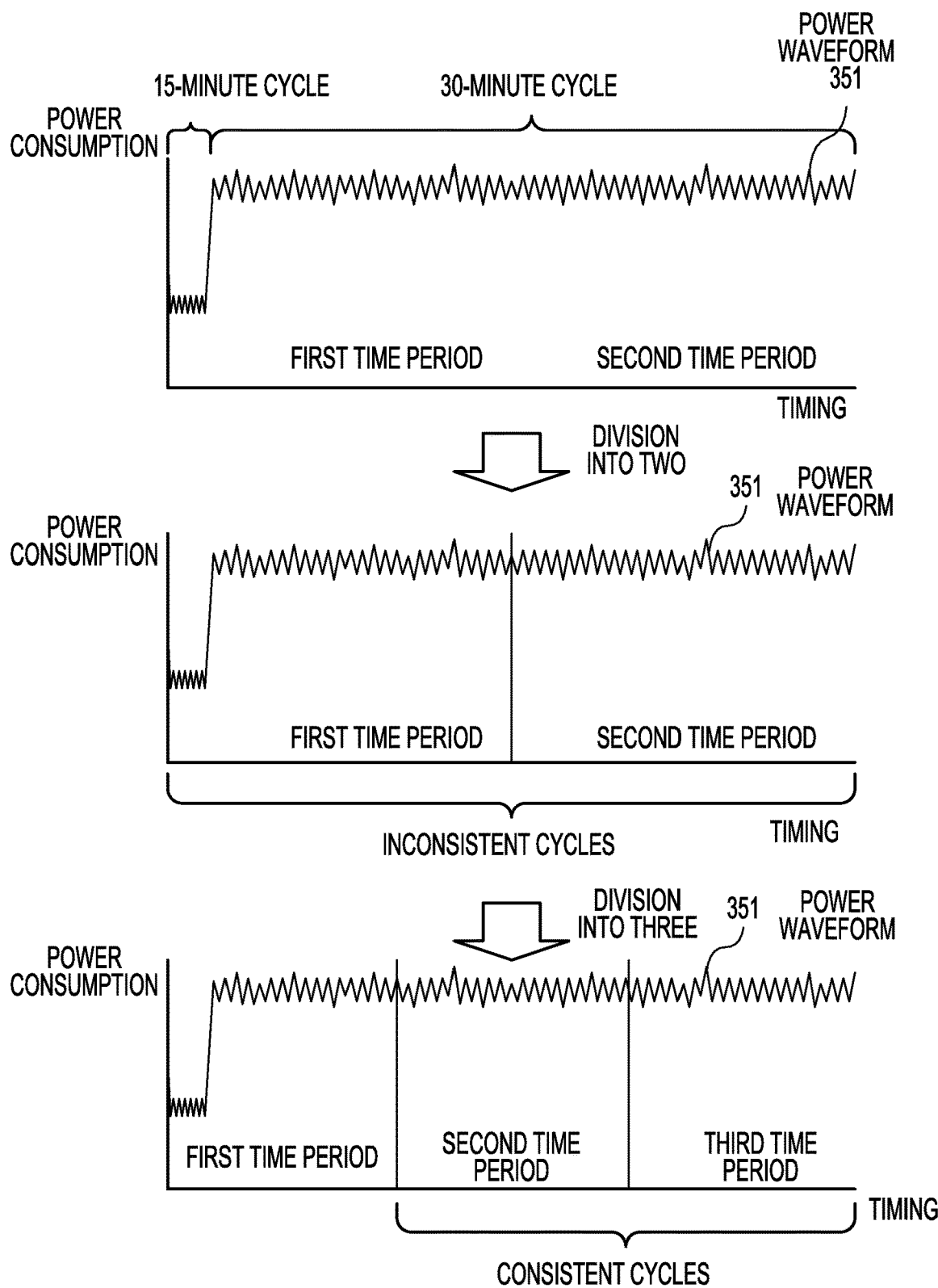
FIG. 25 is a first view illustrating an example of calculation of a cycle for each time period.

FIG. 25 is a first view illustrating an example of the calculation of a cycle for each time period. A power waveform 351 indicates a time-series variation of power consumption of a job, and represents that the power fluctuates in a 15-minute cycle for a predetermined time period from the start of execution of the job and fluctuates in a 30-minute cycle thereafter. In order to calculate different cycles for the times periods, the job analysis unit 161 of the cycle analysis unit 160 divides the entire time period of the execution of the job into two time periods, i.e., a first time period and a second time period. Then, the job analysis unit 161 calculates a correlogram of each of the first time period and the second time period, and obtains a cycle from an average interval of peaks. The cycle comparison unit 162 compares the cycles obtained for the respective time periods. In this case, since the first time period includes the initial time period with the 15-minute cycle, the obtained cycle becomes a value shorter than 30 minutes. As a result, the cycles of the first time period and the second time period are inconsistent with each other.

Thus, the job analysis unit 161 divides the entire time period of the execution of the job into three times periods, i.e., a first time period, a second time period, and a third time period. Then, the job analysis unit 161 calculates a correlogram for each of the first time period, the second time period, and the third time period, and obtains a cycle from an average interval of peaks. The cycle comparison unit 162 compares the cycles obtained for the respective time periods. In this case, since the first time period includes the initial time period with the 15-minute cycle, the obtained cycle becomes a value shorter than 30 minutes. In the meantime, each of the second time period and the third time period has the 30-minute cycle. As a result, while the cycle of the first time period is inconsistent with the cycle of each of the other time periods, the cycle of the second time period and the cycle of the third time period are consistent with each other.

The job analysis unit 161 establishes the calculated cycles for the time periods with the consistent cycles, to be cycles of the corresponding time periods. Then, the job analysis unit 161 and the cycle comparison unit 162 repeat the same process for the cycle-unestablished time period.

Figure 26:
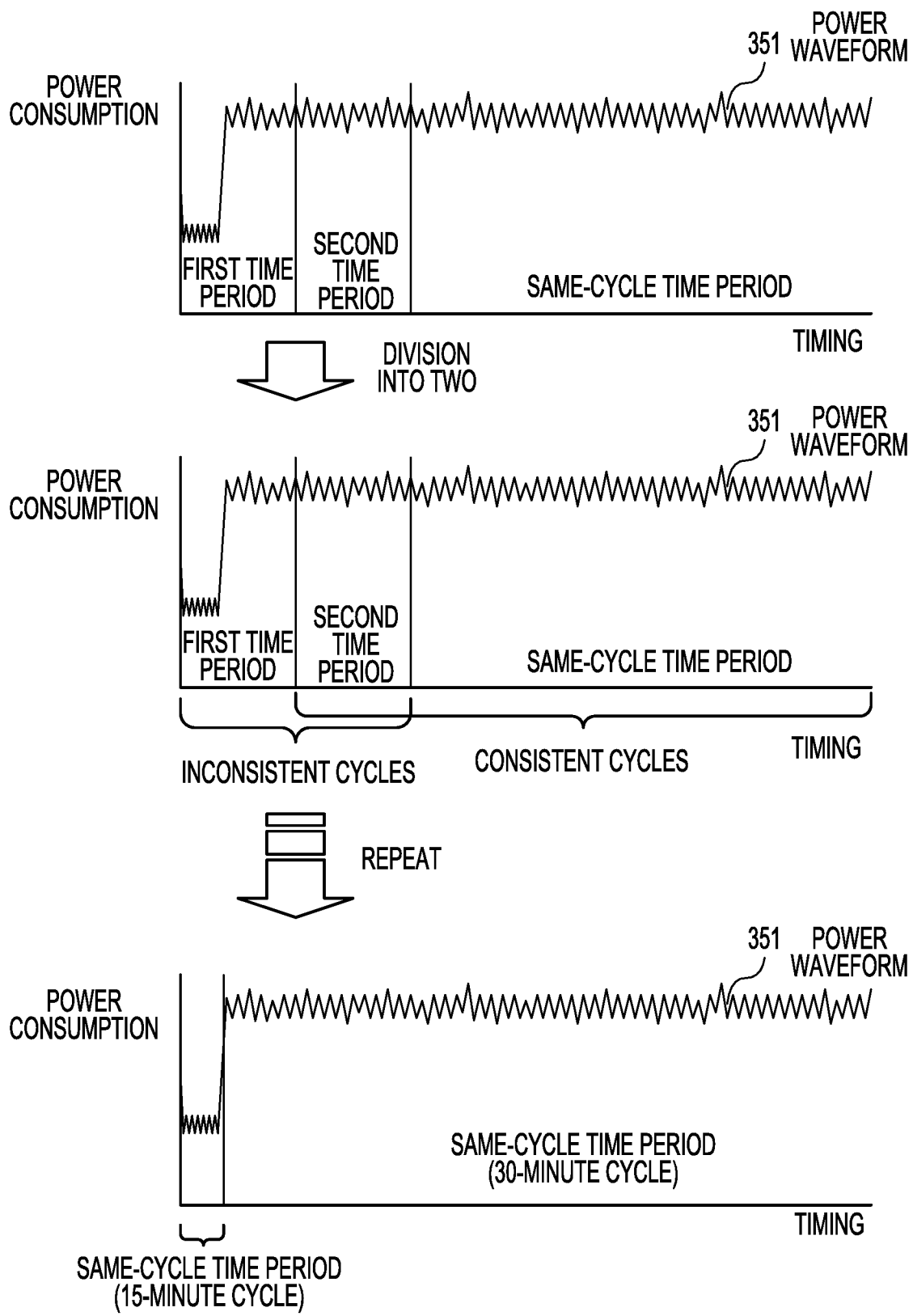
FIG. 26 is a second view illustrating an example of calculation of a cycle for each time period.

FIG. 26 is a second view illustrating an example of the calculation of a cycle for each time period. The time periods with the consistent cycles are considered as same-cycle time periods, and excluded from a subsequent cycle determination target. Accordingly, the job analysis unit 161 divides the cycle-unestablished time period (the first time period in the three division units illustrated in FIG. 25) into two time periods, and calculates cycles of the time periods. Then, the cycle comparison unit 162 compares the cycles of the time periods. In the example of FIG. 26, the cycle of the second time period is consistent with the cycles of the same-cycle time periods. Thus, the job analysis unit 161 causes the second time period to be included in the same-cycle time periods. The cycle of the first time period is inconsistent with the cycles of the other time periods, and the first time period remains a cycle-unestablished time period.

Then, the job analysis unit 161 and the cycle comparison unit 162 repeat the calculation of a cycle and the comparison of cycles while gradually increasing the number of division units from the initial value, for the cycle-unestablished time period. Finally, the same-cycle time period with the 15-minute cycle and the same-cycle time period with the 30-minute cycle are obtained.

The cycles of the time-series variation of the power consumption represented by the power waveform 351 may be correctly determined, so that a delay time in a prediction model for each time period may be correctly set.

Figure 27:
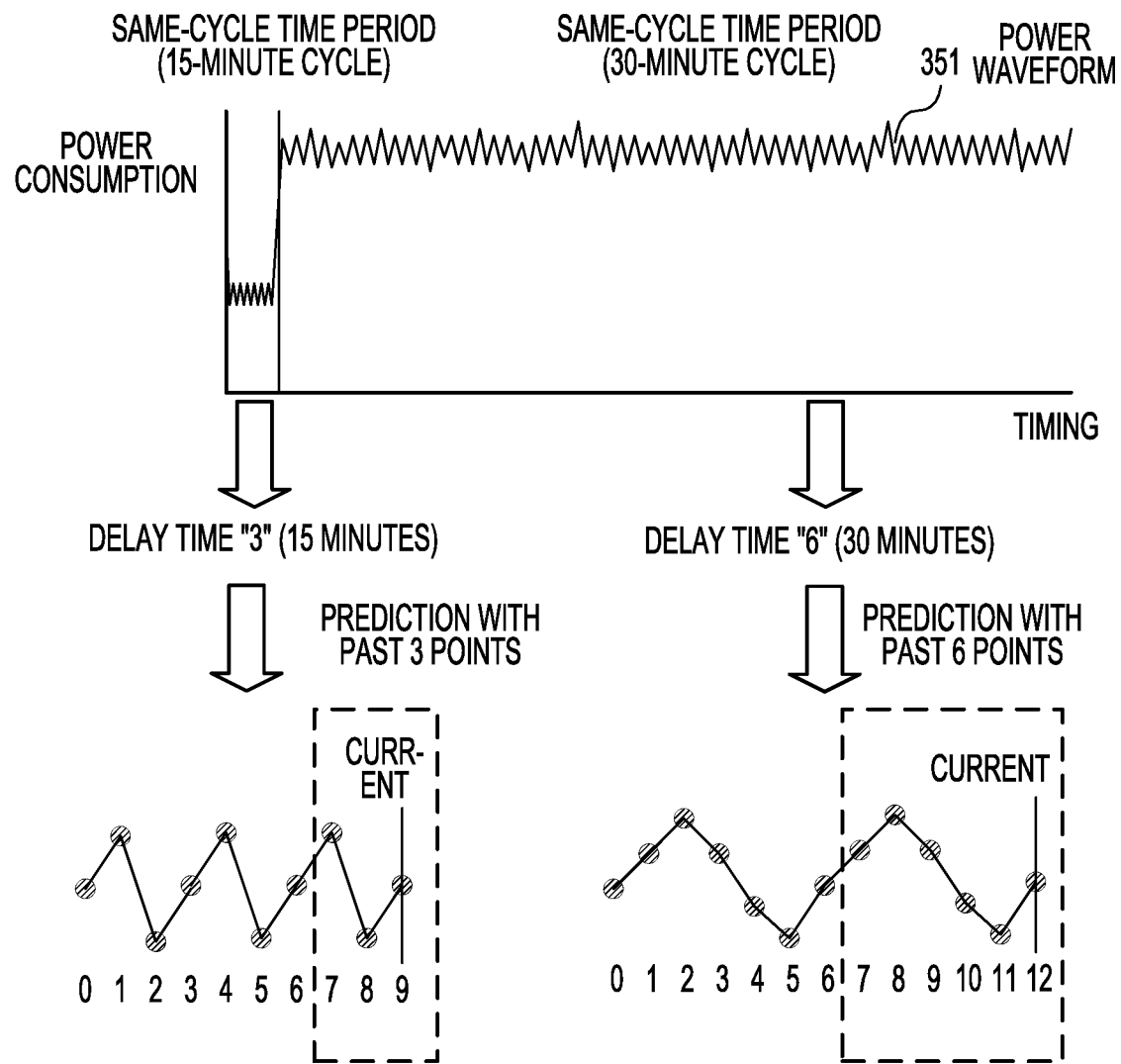
FIG. 27 is a view illustrating an example of a delay time corresponding to a cycle.

FIG. 27 is a view illustrating an example of a time delay according to a cycle. For example, when the time interval for predicting power is 5 minutes, the learning unit 170 generates a prediction model according to a delay time "3" (15 minutes), for the time period with the 15-minute cycle. In this case, a prediction model for predicting future power based on power actual measurement values of past three measurement points is generated. Further, for the time period with the 30-minute cycle, the learning unit 170 generates a prediction model according to a delay time "6" (30 minutes). In this case, a prediction model for predicting future power based on power actual measurement values of past six measurement points.

In addition, while the determination of a cycle for each time period is performed for each executed job, a plurality of jobs that belongs to the same group mostly has the similar periodicity with respect to a time-series variation of power consumption. Thus, the learning unit 170 sets a delay time determined for each same-cycle time period of the same group, for the corresponding time period, and performs the learning of prediction models.

Figure 28:
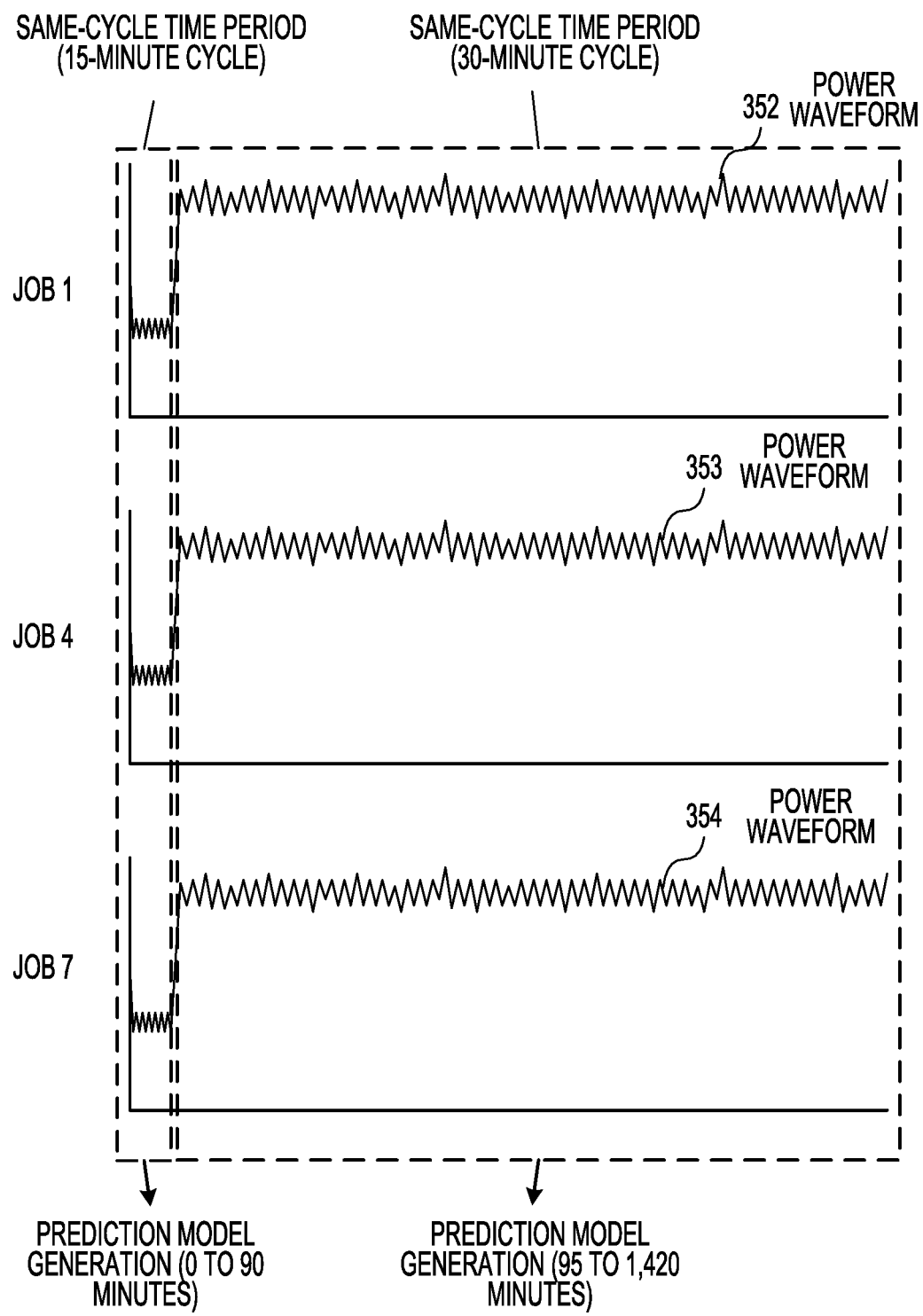
FIG. 28 is a view illustrating an example of a learning using power consumption data of multiple jobs in a group.

FIG. 28 is a view illustrating an example of a learning using power consumption data of a plurality of jobs in a group. The learning unit 170 performs a learning for each same-cycle time period of the same group, and generates a prediction model for each time period. FIG. 28 represents power waveforms 352 to 354 of a plurality of jobs that belongs to "Group A." A prediction model is generated based on the data for the time period from 0 minutes to 90 minutes among the power consumption data representing the power waveforms 352 to 354 of the respective jobs, and another prediction model is generated for the time period from 95 minutes to 1,420 minutes.

The predicted value calculation unit 180 determines a time period to which an elapsed time from the start of execution of a job to a prediction target timing corresponds, and predicts future power consumption of the job that is being executed, using a prediction model for the corresponding time period.

Figure 29:
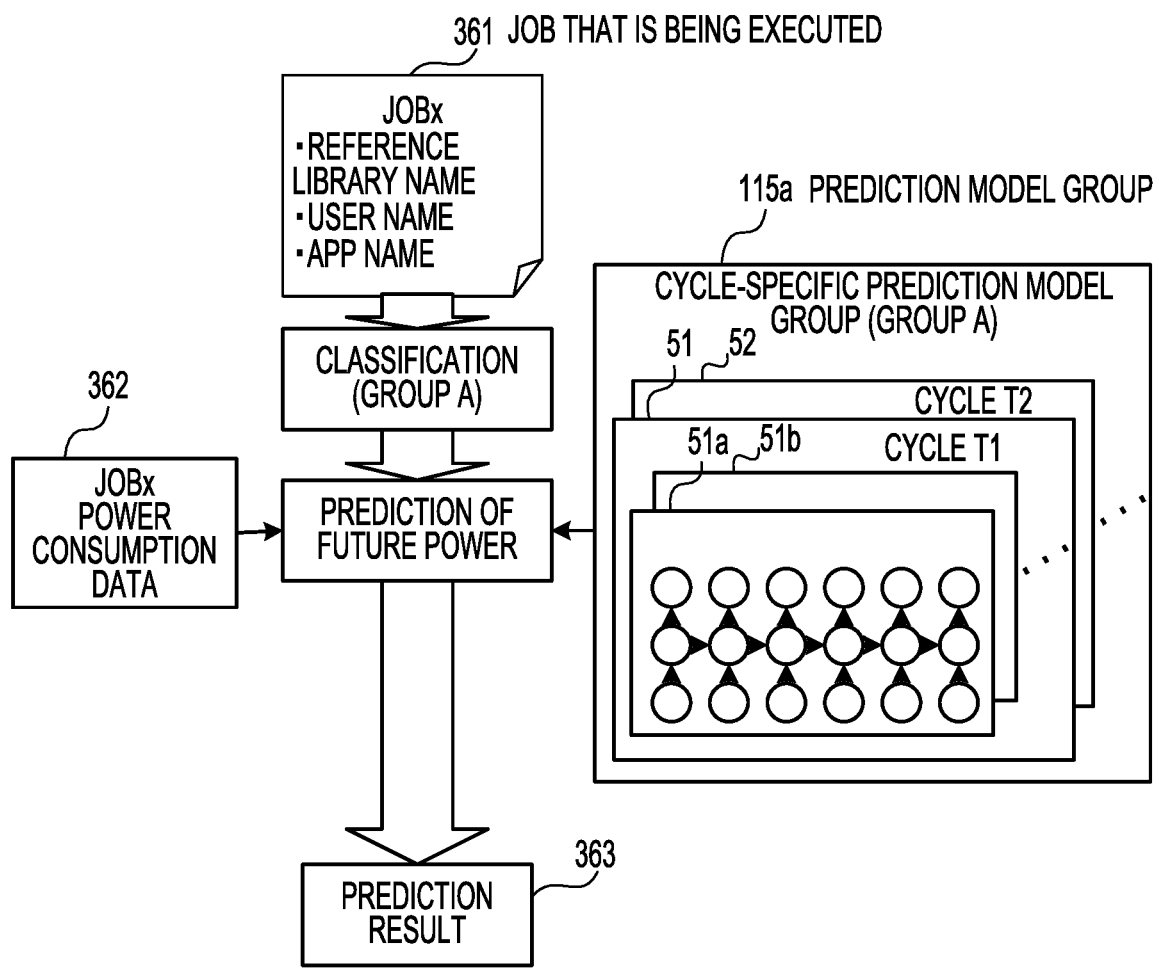
FIG. 29 is a view illustrating a process of predicting future power consumption of a job that is being executed.

FIG. 29 is a view illustrating a process of predicting future power consumption of a job that is being executed. For example, when past/current power consumption data 362 of a job that is being executed 361 are acquired, the job classification unit 140 classifies the job that is being executed, based on the status information of the job that is being executed 361. In the example of FIG. 29, it is assumed that the job 361 is classified into "Group A." In this case, the predicted value calculation unit 180 selects a prediction model to be used for predicting the power consumption from a prediction model group 115 a of "Group A." That is, the predicted value calculation unit 180 determines a time period to which the elapsed time from the start of execution of the job to the prediction target timing belongs. Then, the predicted value calculation unit 180 predicts the future power consumption by inputting the power consumption data 362 obtained as actual measurement values to the prediction model corresponding to the cycle of the corresponding time period. In addition, as illustrated in FIG. 22, there may be a plurality of prediction models for a prediction target measurement point. In this case, the predicted value calculation unit 180 refers to the prediction model selection table illustrated in FIG. 23, selects a prediction model with the highest accuracy, and employs a prediction result 363 by the prediction model. As a result, the prediction accuracy is improved.

Hereinafter, the process procedure for predicting power consumption in the management server 100 will be described with reference to flowcharts.

Figure 30:
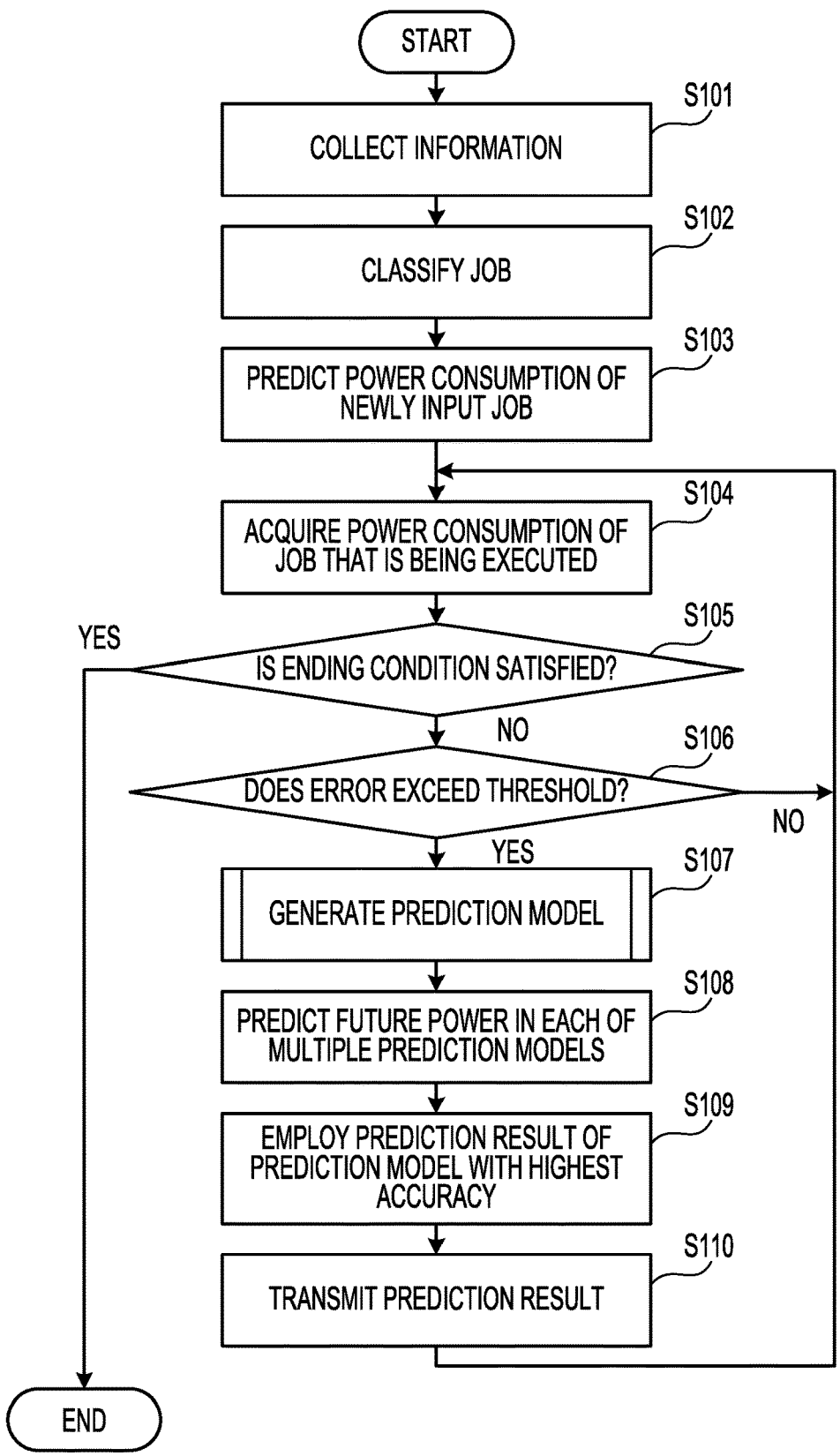
FIG. 30 is a flowchart illustrating an example of a process procedure for predicting power consumption.

FIG. 30 is a flowchart illustrating an example of the process procedure for predicting power consumption. Hereinafter, the process represented in FIG. 30 will be described along step numbers.

(Step 101) The metrics collection unit 130 collects information from the HPC operation management server 200. For example, the metrics collection unit 130 acquires information according to an information acquisition instruction output from the timer unit 120 at a predetermined time interval. The information to be acquired includes status information of a job or actual measurement values of power consumption of a job that is being executed. The status information of a job includes a job name, a reference library name, a user name, an App name, etc. Further, the status information of a job includes, for example, information on whether the corresponding job is a newly input unexecuted job, a job that is being executed, or an executed job. The metrics collection unit 130 stores the acquired information in the DB 110.

(Step S102) The job classification unit 140 classifies each job into one of a plurality of groups, based on the status information of the job. For example, when a new job is input, the job classification unit 140 classifies the job into one of a plurality of groups based on the collected status information of each job, and stores the classification result in the classification database 113. In addition, jobs that belong to the same group are estimated to have a similar behavior, and predicted to be also similar to each other in time-series variation of power consumption.

(Step S103) The job classification unit 140 predicts power of the newly input job, based on power consumption data of an executed job in the same group as that of the newly input job. The job classification unit 140 transmits the prediction result to the power comparison unit 150. In addition, the job classification unit 140 may transmit the prediction result to the prediction result transmission unit 190. The prediction result transmission unit 190 transmits the prediction result of the power consumption of the newly input job, to the HPC operation management server 200. Then, the job scheduling unit 240 of the HPC operation management server 200 performs a job scheduling to, for example, suppress the entire power consumption of the HPC system 30 from exceeding a predetermined value.

(Step S104) The metrics collection unit 130 acquires information of power consumption of a job that is being executed. For example, the metrics collection unit 130 acquires power consumption information according to a power consumption acquisition instruction output from the timer unit 120 at a predetermined time interval. The metrics collection unit 130 additionally stores the acquired power consumption information in the job power consumption information 112 of the DB 110.

(Step S105) The job classification unit 140 determines whether a condition for ending the process is satisfied, based on the information collected by the metrics collection unit 130. For example, the ending condition provides that the execution of all jobs that are being executed be ended. The job classification unit 140 may determine whether a job that is being executed is ended, according to, for example, whether the latest power value of power consumption time-series data of the corresponding job has been acquired. In addition, the job classification unit 140 may also determine that the condition for ending the power consumption predicting process that is being currently performed is satisfied, when the next timing for collecting information in step S101 comes. When it is determined that the ending condition is satisfied, the job classification unit 140 ends the process of predicting power consumption. In addition, when it is determined that the ending condition is not satisfied, the job classification unit 140 proceeds to the process in step S106.

(Step S106) The power comparison unit 150 determines whether an error between a predicted value of the power consumption of the job that is being executed and the actual measurement values of the job exceeds a threshold value. In addition, the threshold value of the error is set in advance according to, for example, the prediction accuracy of power consumption allowable in the HPC system 30. When it is determined that the error exceeds the threshold value, the power comparison unit 150 proceeds to the process in step S107. In addition, when it is determined that the error does not exceed the threshold value, the power comparison unit 150 proceeds to the process in step S104.

(Step S107) The cycle analysis unit 160 and the learning unit 170 operate in cooperation with each other, to generate a prediction model for predicting the power consumption of the job that is being executed. The process procedure for generating a prediction model will be described in detail later (see FIG. 31).

(Step S108) The predicted value calculation unit 180 calculates a predicted value of future power consumption of the job that is being executed, based on the generated predicted model.

(Step S109) When there exists a plurality of prediction models, the predicted value calculation unit 180 selects a prediction model with the highest prediction accuracy, and employs a prediction result using the prediction model as the prediction result of the power consumption of the job that is being executed. For example, the predicted value calculation unit 180 calculates predicted values of power of a predetermined number of measurement points whose actual measurement values have already been obtained, using prediction models capable of predicting power of a prediction target measurement point. For the calculation of predicted values, for example, past actual measurement values of a job that is being executed and is a current prediction target may be used. The predicted value calculation unit 180 compares the predicted values of the predetermined number of measurement points calculated for the respective prediction models with the actual measurement values of the measurement points, and calculates RMSE values of the prediction models. The predicted value calculation unit 180 employs, for example, a predicted result of a prediction model with the smallest calculated RMSE value, as the predicted result of the power consumption of the job that is being executed. Further, the predicted value calculation unit 180 may employ a prediction result of a prediction model with the smallest sum of RMSE values calculated multiple times in the past, as the prediction result of the power consumption of the job that is being executed.

(Step S110) The prediction result transmission unit 190 transmits the employed prediction result, as the prediction result of the power consumption of the job that is being executed, to the HPC operation management server 200. Based on the prediction result, the job scheduling unit 240 of the HPC operation management server 200 determines whether the power consumption of the HPC system 30 exceeds a predetermined value, and when it is determined that the power consumption of the HPC system 30 exceeds a predetermined value, a process of forcibly stopping a job is performed. Then, the process proceeds to step S104.

Next, the process of generating a prediction model will be described in detail.

Figure 31:
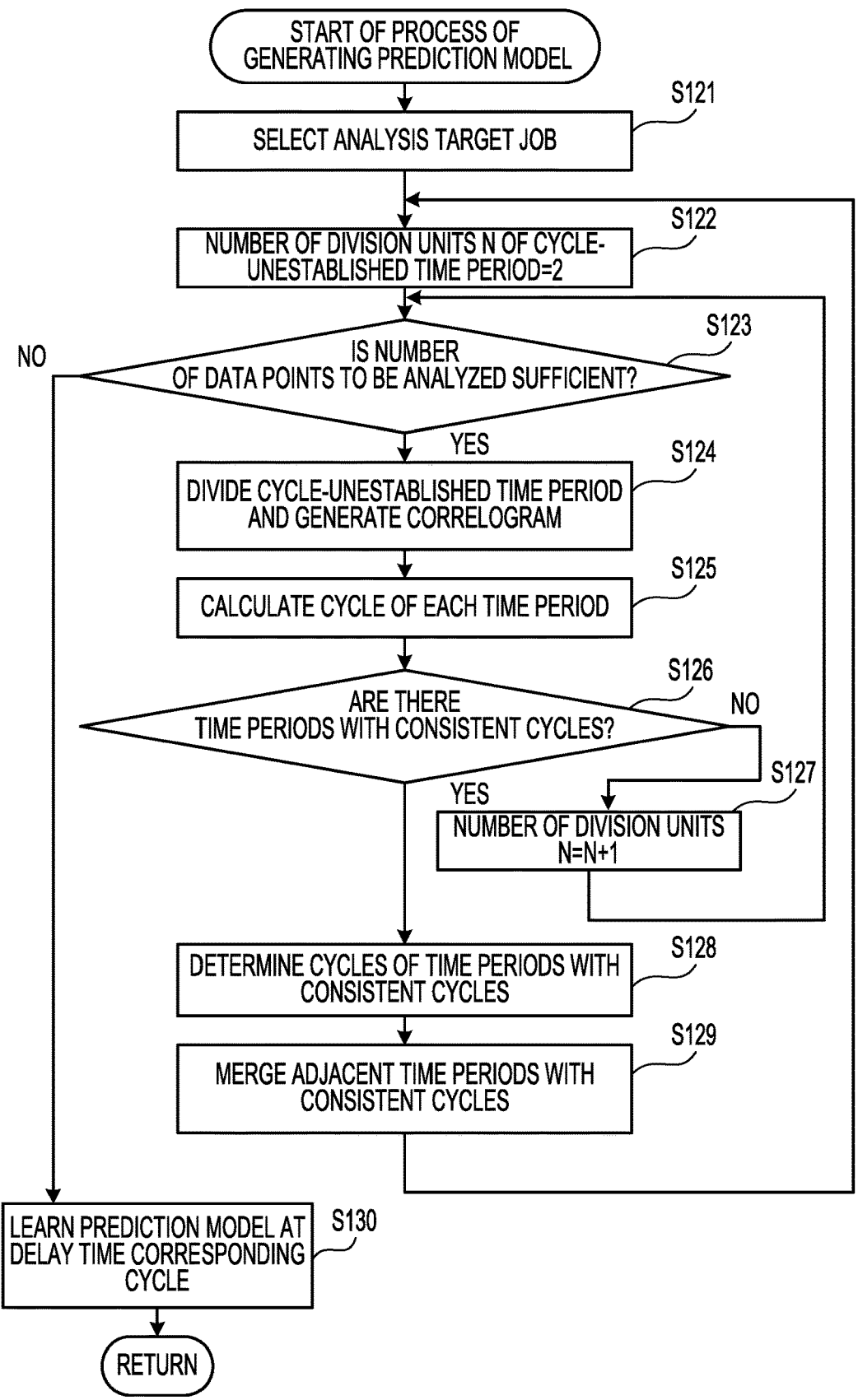
FIG. 31 is a flowchart illustrating an example of a process procedure for generating a prediction model.

FIG. 31 is a flowchart illustrating an example of the process procedure for generating a prediction model. Hereinafter, the process illustrated in FIG. 31 will be described along step numbers.

(Step S121) The job analysis unit 161 of the cycle analysis unit 160 selects a job of the same group as that of the job that is being executed, as an analysis target.

(Step S122) The job analysis unit 161 sets the number of division units N to the initial value "2" (N=2), for a cycle-unestablished time period (N=2).

(Step S123) The job analysis unit 161 determines whether there are a sufficient number of data points of actual measurement values of power consumption of the analysis target job, within the cycle-unestablished time period. For example, the job analysis unit 161 determines that the number of data points is sufficient, when the number of data points of the analysis target job in the cycle-unestablished time period is equal to or larger than a predetermined number (e.g., 30 points). When it is determined that the number of data points is sufficient, the job analysis unit 161 proceeds to the process in step S124. When it is determined that the number of data points is not sufficient, the job analysis unit 161 proceeds to the process in step S130.

(Step S124) The job analysis unit 161 divides the power consumption data of the analysis target job in the N number of division units in the timing axis direction, and generates a correlogram for each divided time period.

(Step S125) The job analysis unit 161 calculates peaks (local maximum values) of the correlogram generated for each time period, and calculates a cycle for each time period based on an average interval of the peak positions. As to determining whether or not it is a peak, for example, when a correlation coefficient of an analysis target lag value is larger than or equal to correlation coefficients of lag values on both sides of the analysis target lag value, the job analysis unit 161 determines the correlation coefficient of the analysis target lag value to be a peak, and determines the lag value of the peak to be a peak position. When a plurality of lag values exists as peaks (when peaks are flat), the job analysis unit 161 determines the minimum lag value as a peak position.

(Step S126) The cycle comparison unit 162 compares the cycles of the divided time periods (including cycle-established time periods), and determines whether there are time periods with consistent cycles. In addition, the cycle comparison unit 162 may determine that cycles are consistent with each other, when a difference of cycles falls within an allowable error range. The cycle comparison unit 162 may determine whether cycles are consistent with each other, only for adjacent time periods. When it is determined that there are time periods with consistent cycles, the cycle comparison unit 162 proceeds to the process in step S128. In addition, when it is determined that there are no time periods with consistent cycles, the cycle comparison unit 162 proceeds to the process in step S127.

(Step S127) The job analysis unit 161 increments the value of the number of division units N for the cycle-unestablished time period by 1 (N=N+1), and proceeds to the process in step S123.

(Step S128) The job analysis unit 161 establishes the cycles of the time periods with consistent cycles, as calculated cycles. The time period of which cycle has been determined is treated as a cycle-established time period thereafter. The job analysis unit 161 registers the range and the cycle of the cycle-established time period, in the analysis result information 114.

(Step S129) When there are adjacent time periods with consistent cycles in the job analysis information, the job analysis unit 161 merges the time periods with each other. The merge of time periods indicates replacing the records of the respective adjacent time periods with one record that sets one time period including both the time periods. Then, the job analysis unit 161 proceeds to the process in step S122.

(Step S130) For each cycle-established time period, the learning unit 170 learns a prediction model by a delay time corresponding to the cycle, based on time-series power data of an executed job in the same group as that of the job that is being executed.

In this way, a prediction model may be learned by an appropriate delay time, and as a result, the calculation accuracy of a predicted value using a prediction model is improved.

Next, the process procedure for forcibly stopping a job by the HPC operation management server 200 will be described.

Figure 32:
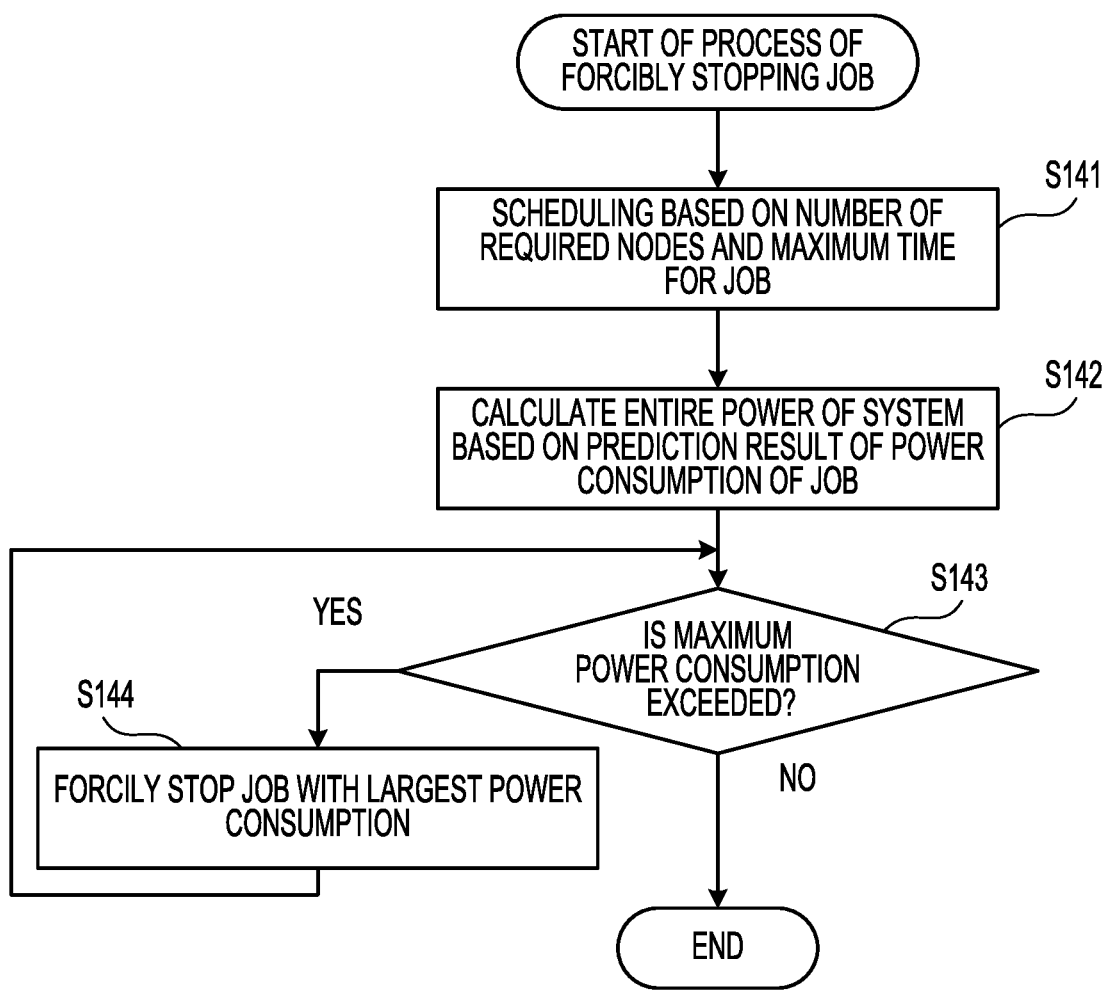
FIG. 32 is a flowchart illustrating an example of a process procedure for forcibly stopping a job.

FIG. 32 is a flowchart illustrating an example of the process procedure for forcibly stopping a job. Hereinafter, the process illustrated in FIG. 32 will be described along step numbers.

(Step S141) The job scheduling unit 240 performs a job scheduling based on the number of required nodes and the maximum time for a job. The scheduling result is transmitted to the control instruction unit 250. The control instruction unit 250 instructs the HPC system 30 to execute a job according to the schedule.

(Step S142) When a prediction result of power consumption of a job that is being executed is received, the job scheduling unit 240 calculates a future time-series variation of the entire power of the HPC system 30, based on the prediction result. For example, the job scheduling unit 240 adds up a power waveform of each job, and determines the adding-up result to be the power of the HPC system 30.

(Step S143) The job scheduling unit 240 determines whether the power of the HPC system 30 exceeds the maximum supply power. When it is determined that there is a time when the power consumption exceeds the maximum supply power, the job scheduling unit 240 proceeds to the process in step S144. When it is determined that the power consumption does not exceed the maximum supply power, the job scheduling unit 240 ends the process.

(Step S144) The job scheduling unit 240 forcibly stops one of jobs that are being executed. For example, the job scheduling unit 240 forcibly stops a job of which power consumption is the largest, among jobs that are being executed. Then, the job scheduling unit 240 proceeds to the process in step S143.

In this way, it is possible to control the power consumption of the HPC system 30 not to exceed the maximum supply power, based on the prediction result of the power consumption of the job that is being executed. Since the prediction result of the power consumption of the job that is being executed is accurate, it is eliminated to forcibly stop a job, so that the execution efficiency of a job is improved. Further, since the prediction result of the power consumption of the job that is being executed is accurate, it is possible to suppress the occurrence of a situation, contrary to the prediction, where the power consumption of the HPC system 30 exceeds the maximum supply power, so that the stability of the HPC system 30 is improved.

In addition, since the power consumption of each job may be accurately predicted, the power consumption of the HPC system 30 is appropriately controlled not to exceed contracted power, in a case where a contract has been made on a power rate based on an on-demand rage system.

Figure 33:
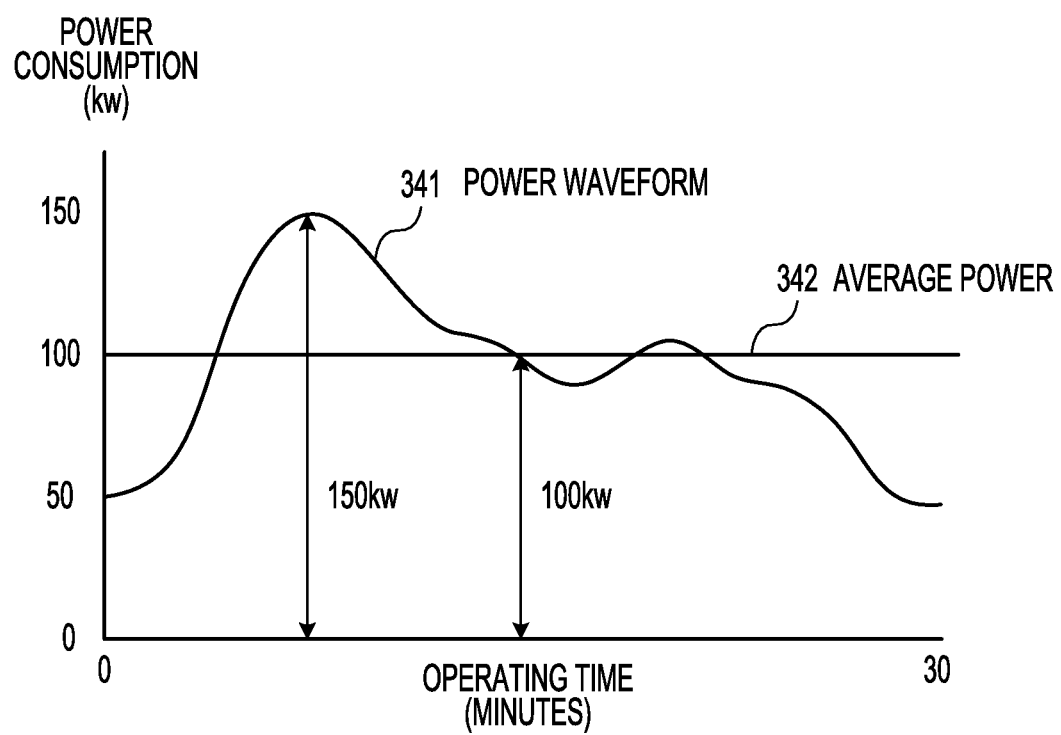
FIG. 33 is a view for explaining an on-demand rate system.

FIG. 33 is a view for explaining the on-demand fee system. FIG. 33 represents a graph of the power waveform 341 that indicates the entire power consumption of the HPC system 30. The horizontal axis of the graph represents an operating time of the HPC system, and the vertical axis represents power consumption. Average power 342 in a predetermined time period (e.g., 30 minutes) of the time-series variation of the power consumption represented by the power waveform 341 becomes a power usage amount in the corresponding time period. In the example of FIG. 33, the instantaneous maximum power consumption is 150 kW, and the power usage amount is calculated as 100 kW.

Here, in the on-demand rate system, a monthly power rate is calculated from a calculation equation "power rate=contracted power rate+power rate unit price×power usage amount of one month." Since the HPC system 30 consumes an enormous amount of power, the contracted power rate becomes high. The contracted power rate is determined according to a power usage amount (maximum demand power) for 30 minutes during which a largest amount of power was used, in the previous year (past one year). Thus, when the contracted power rate is exceeded even once in the unit time zone of 30 minutes, the power rate may increase next year.

When power consumption of a newly input job may be accurately predicted, the HPC operation management server 200 may appropriately determine whether power usage amount in a future time zone of 30 minutes exceeds the maximum demand power of the past one year. When it is determined that the maximum demand power of the past one year may be exceeded, the HPC operation management server 200 may delay the start of execution of the newly input job or forcibly stop a job that is being executed, so as to suppress the power usage amount from exceeding the maximum demand power of the past one year. As a result, the power rate may be suppressed.

Other Embodiments

In the second embodiment, the time corresponding to one cycle of calculated cycles is set as a delay time. However, the management server 100 may set a time which is an integral multiple of a cycle, as a delay time. For example, the management server 100 may set a time corresponding to two cycles as a delay time.

While embodiments have been described, the components of each unit in the embodiments may be substituted by other components having the similar function. Further, an arbitrary configuration or process may be added. Further, any two or more of the components (features) of the embodiments described above may be combined with each other.

According to an aspect of the embodiments, the prediction accuracy of a power consumption of a job is improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
dividing a time from a start to an end of execution of a first job into a plurality of time periods, the time being represented in first power consumption information that includes an actual measurement value of power consumption according to an elapsed time from the start of execution of the first job, the first job being among a plurality of first jobs;
calculating, for each of the plurality of time periods, a cycle of a time-series variation of power consumption within the time period, based on the first power consumption information;
generating, for each of the plurality of time periods, a prediction model for predicting power consumption of a predetermined future time using an actual measurement value of power consumption for a time corresponding to the calculated cycle, based on the first power consumption information;
acquiring second power consumption information that is an actual measurement value of power consumption according to an elapsed time from a start of execution of a second job that is being executed; and
predicting future power consumption of the second job, using the prediction model generated for a time period including the elapsed time from the start of execution of the second job to a present, among the plurality of time periods, based on the second power consumption information.

2. The non-transitory computer-readable recording medium according to claim 1, the process further comprising:
classifying the plurality of first jobs and the second job into one or more groups based on a similarity in status information of each of the plurality of first jobs and the second job;
performing the calculating a cycle and the generating a prediction model, for a group to which the second job belongs; and
predicting the future power consumption of the second job using the prediction model generated for the group to which the second job belongs.

3. The non-transitory computer-readable recording medium according to claim 1, the process further comprising:
generating a plurality of prediction models for different predetermined future times;
selecting one or more prediction models capable of predicting power consumption at a prediction target timing, from among the plurality of prediction models; and employing a prediction result of a prediction model among the one or more prediction models, in accordance with a prediction accuracy calculated based on a past prediction performance.

4. The non-transitory computer-readable recording medium according to claim 1, the process further comprising:
setting the time from the start to the end of execution of the first job as an initial value of a cycle-unestablished time period of which cycle is not established;
each time the cycle-unestablished time period is set, repeatedly dividing the cycle-unestablished time period while increasing a number of division units from the initial value;
each time the cycle-unestablished time period is divided, calculating a predicted cycle of a time-series variation of power consumption for each divided time period; and
establishing, when there are time periods with same calculated predicted cycles, the calculated predicted cycles as cycles of the corresponding time periods, setting the corresponding time periods as cycle-established time periods, and setting a time period other than the cycle-established time periods as a new cycle-unestablished time period.

5. The non-transitory computer-readable recording medium according to claim 1, wherein the cycle of the time-series variation of power consumption is obtained from an average interval of peaks of the power consumption.

6. A method of predicting job power, the method comprising:
dividing, by a computer, a time from a start to an end of execution of a first job into a plurality of time periods, the time being represented in first power consumption information that includes an actual measurement value of power consumption according to an elapsed time from the start of execution of the first job, the first job being among a plurality of first jobs;
calculating, for each of the plurality of time periods, a cycle of a time-series variation of power consumption within the time period, based on the first power consumption information;
generating, for each of the plurality of time periods, a prediction model for predicting power consumption of a predetermined future time using an actual measurement value of power consumption for a time corresponding to the calculated cycle, based on the first power consumption information;
acquiring second power consumption information that is an actual measurement value of power consumption according to an elapsed time from a start of execution of a second job that is being executed; and
predicting future power consumption of the second job, using the prediction model generated for a time period including the elapsed time from the start of execution of the second job to a present, among the plurality of time periods, based on the second power consumption information.

7. The method of predicting job power according to claim 6, wherein the cycle of the time-series variation of power consumption is obtained from an average interval of peaks of the power consumption.

8. An information processing apparatus, comprising:
a memory; and
a processor coupled to the memory and the processor configured to:
divide a time from a start to an end of execution of a first job into a plurality of time periods, the time being represented in first power consumption information that includes an actual measurement value of power consumption according to an elapsed time from the start of execution of the first job, the first job being among a plurality of first jobs;
calculate, for each of the plurality of time periods, a cycle of a time-series variation of power consumption within the time period, based on the first power consumption information;
generate, for each of the plurality of time periods, a prediction model for predicting power consumption of a predetermined future time using an actual measurement value of power consumption for a time corresponding to the calculated cycle, based on the first power consumption information;
acquire second power consumption information that is an actual measurement value of power consumption according to an elapsed time from a start of execution of a second job that is being executed; and
predict future power consumption of the second job, using the prediction model generated for a time period including the elapsed time from the start of execution of the second job to a present, among the plurality of time periods, based on the second power consumption information.

9. The information processing apparatus according to claim 8, wherein the cycle of the time-series variation of power consumption is obtained from an average interval of peaks of the power consumption.

* * * * *